(12) United States Patent
Warner et al.

(10) Patent No.: US 11,565,971 B2
(45) Date of Patent: Jan. 31, 2023

(54) ASPHALT BINDER ADDITIVE COMPOSITIONS AND METHODS OF USE

(71) Applicant: COLLABORATIVE AGGREGATES, LLC, Mill Valley, CA (US)

(72) Inventors: John C. Warner, Mill Valley, CA (US); Laura Rose Muollo, Mill Valley, CA (US); Rowan Lewis Walker, Mill Valley, CA (US); Jason R. Bianchini, Mill Valley, CA (US)

(73) Assignee: COLLABORATIVE AGGREGATES, LLC, Mill Valley, CA (US)

( * ) Notice: Subject to any disclaimer, the term of this patent is extended or adjusted under 35 U.S.C. 154(b) by 1044 days.

(21) Appl. No.: 16/255,985

(22) Filed: Jan. 24, 2019

(65) Prior Publication Data
US 2019/0152850 A1    May 23, 2019

Related U.S. Application Data

(63) Continuation-in-part of application No. 15/978,515, filed on May 14, 2018, now abandoned, which is a
(Continued)

(51) Int. Cl.
| | |
|---|---|
| *C08L 91/00* | (2006.01) |
| *C04B 24/06* | (2006.01) |
| *C08L 95/00* | (2006.01) |
| *C09J 191/00* | (2006.01) |
| *C04B 26/26* | (2006.01) |

(Continued)

(52) U.S. Cl.
CPC .............. *C04B 24/06* (2013.01); *C04B 26/26* (2013.01); *C08K 5/09* (2013.01); *C08K 5/10* (2013.01); *C08L 91/00* (2013.01); *C08L 91/005* (2013.01); *C08L 95/00* (2013.01); *C09J 191/00* (2013.01); *C09J 191/005* (2013.01); *C08K 5/0025* (2013.01); *C08K 5/132* (2013.01); *C08K 5/1345* (2013.01); *C08L 2555/10* (2013.01); *C08L 2555/24* (2013.01); *C08L 2555/34* (2013.01);
(Continued)

(58) Field of Classification Search
CPC .............................. C08L 95/00; C08L 95/005
See application file for complete search history.

(56) References Cited

U.S. PATENT DOCUMENTS

| 2,648,644 A | 8/1953 | McMillan et al. |
| 4,576,648 A | 3/1986 | Demangeon et al. |

(Continued)

FOREIGN PATENT DOCUMENTS

| FR | 2909871 A1 * | 6/2008 | .............. A61K 8/37 |
| GB | 00663 A | 1/1915 | |

(Continued)

OTHER PUBLICATIONS

FR 2 909 871 Espacenet Machine Translation (Year: 2022).*
(Continued)

*Primary Examiner* — Alexandra M Moore
(74) *Attorney, Agent, or Firm* — Cermak Nakajima & McGowan LLP; Malcolm K. McGowan

(57) ABSTRACT

The present application discloses compositions and methods for improving or enhancing the paving or re-paving of asphalt to road surfaces comprising the addition of the composition to the asphalt.

5 Claims, 2 Drawing Sheets

Related U.S. Application Data continuation of application No. 14/763,936, filed as application No. PCT/US2014/064882 on Nov. 10, 2014, now Pat. No. 9,994,485.

(60) Provisional application No. 61/902,706, filed on Nov. 11, 2013.

(51) Int. Cl.
*C08K 5/10* (2006.01)
*C08K 5/09* (2006.01)
C08K 5/00 (2006.01)
C08K 5/132 (2006.01)
C08K 5/134 (2006.01)

(52) U.S. Cl.
CPC ....... *C08L 2555/62* (2013.01); *C08L 2555/70* (2013.01); *Y02A 30/30* (2018.01)

(56) References Cited

U.S. PATENT DOCUMENTS

| | | | |
|---|---|---|---|
| 5,928,418 A * | 7/1999 | Tamaki | C08L 95/005 427/249.7 |
| 6,261,356 B1 | 7/2001 | Isobe et al. | |
| 6,342,208 B1 * | 1/2002 | Hyldgaard | A61Q 5/02 424/59 |
| 7,226,501 B2 | 6/2007 | Thorstensson et al. | |
| 2005/0197267 A1 | 9/2005 | Zaki et al. | |
| 2006/0089431 A1 | 4/2006 | Kawakami et al. | |
| 2012/0167802 A1 | 7/2012 | Huh | |
| 2016/0264464 A1 | 9/2016 | Warner et al. | |
| 2018/0257985 A1 | 9/2018 | Warner et al. | |

FOREIGN PATENT DOCUMENTS

| | | |
|---|---|---|
| GB | 2462371 A | 2/2010 |
| JP | 2000-143993 A | 5/2000 |
| JP | 2005-154465 A | 6/2005 |
| JP | 2005-154466 A | 6/2005 |
| JP | 2005-154467 A | 6/2005 |
| JP | 2007-262406 A | 10/2007 |
| WO | WO90/07331 A | 7/1990 |
| WO | WO01/74948 A1 | 10/2001 |
| WO | WO02/060832 A | 8/2002 |
| WO | WO2012/117429 A1 | 9/2012 |
| WO | WO2013/053882 A1 | 4/2013 |
| WO | WO2013/090238 A1 | 6/2013 |

OTHER PUBLICATIONS

Office Action from co-pending U.S. Appl. No. 15/978,515, filed Sep. 6, 2019.
International Search Report for PCT Patent App. No. PCT/US2014/064882 (dated Mar. 25, 2015).
English translation of Notice of Reasons for Rejection for Japanese Patent App No. 2016-553261 (dated Sep. 26, 2018).

* cited by examiner

ASPHALT BINDER ADDITIVE COMPOSITIONS AND METHODS OF USE

RELATED APPLICATION

This application claims the priority benefit of U.S. patent application Ser. No. 15/978,515, filed May 14, 2018, which is a continuation of U.S. patent application Ser. No. 14/763,936, filed Nov. 10, 2014, now U.S. Pat. No. 9,994,485; which claims benefit of U.S. Provisional Application No. 61/902,706, filed Nov. 11, 2013. The contents of these priority applications are incorporated herein by reference in their entirety.

TECHNICAL FIELD

The present invention relates to asphalt binder additive materials useful in paving, roofing and other construction projects. More particularly, the invention relates to asphalt binder additives that provide improved properties to asphalt mixtures. The additives are useful in methods of incorporating recycled, reclaimed and recovered asphalt binders and mixtures into new ones.

BACKGROUND OF THE APPLICATION

The reuse of removed asphalt materials from road paving and roofing has gained greater acceptance for the past two decades. However, paved surfaces and roofing surfaces still show a finite durability, and continue to be removed. This burden of materials and demand for natural resources could be reduced by increasing the content of removed materials into the newly furnished asphalt product.

Rejuvenation throughout most of the twentieth century typically referred to a process of recoating an existing paved surface. A more durable solution is the reuse of materials such as reclaimed or recycled asphalt pavement (RAP) or recycled asphalt shingle (RAS), removed from an old road or roof then reincorporated into a new asphalt surface. State transportation agencies are often reluctant to use higher RAP or RAS content because they contain asphalt binder that has been highly aged, and is much stiffer than virgin binder. (RAS has an even stiffer binder than RAP). Accordingly, there has been a concern that incorporating higher RAP or RAS content may lead to asphalt mixtures that are high in stiffness and consequently might be susceptible to failures in the field such as cracking or moisture damage. The stiffness increase can be mitigated to some extent by the use of a softer binder, but if incomplete blending occurs between the soft binder and the much stiffer RAP/MSW/PCAS binders, the resultant mixture may still be susceptible to cracking, moisture damage, or rutting in the field.

SUMMARY OF THE APPLICATION

It is an object of the present invention to provide compositions that, when added to asphalt mixtures comprised of reclaimed or recycled asphalt pavement (RAP) or recycled asphalt shingle (RAS), result in asphalt compositions that have comparable mechanical, aging, and wear properties to asphalt consisting of virgin materials. These compositions have utility as rejuvenators that allow for an increase in the RAP and/or RAS content in asphalt mixtures well above the typical RAP contents of 15-20% that are currently in use.

It is another object of the present invention to provide compositions that have applications as additives that increase the workability of asphalt mixtures at any given temperature. These additives are useful in virgin asphalt mixtures as well as asphalt mixtures comprised of RAP or RAS. In some embodiments, the addition of the composition modifies the performance grade of the asphalt binder.

It is a further object of the present invention to provide compositions that are capable of reducing the working temperature of an asphalt mixture toward a "warm mix asphalt" (WMA) mixture as compared to a "hot mix asphalt" (HMA). Such compositions allow the asphalt mixture to be mixed at a lower temperature than used for a HMA, and extends the range of possible lay-down temperatures to ones lower than required for lay-down of HMA.

It is yet a further object of the present invention to provide compositions that are capable of aiding compaction of asphalt mixtures, as measured by a reduction of the number of air voids in the mixture.

Accordingly, in one aspect, the present invention provides an asphalt binder additive composition comprising: (a) a carrier matrix; and (b) an agent selected from the group consisting of a curing agent and a masked curing agent. In some embodiments, the asphalt binder additive composition further comprises (d) a surfactant.

In another aspect, the present invention provides an asphalt binder additive composition comprising a carrier matrix and a curing agent, wherein the curing agent comprises a compound of formula

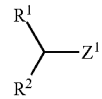

wherein each $R^1$ and $R^2$ is independently selected from the group consisting of hydrogen or $(C_1$-$C_{18})$ linear or branched alkyl or alkenyl, wherein each $(C_1$-$C_{18})$ linear or branched alkyl or alkenyl is unsubstituted or substituted with one or more substituents selected from the group consisting of halo, nitro, trifluoromethyl, trifluoromethoxy, methoxy, carboxy, —$NH_2$, —OH, —SH, —$NHCH_3$, —$N(CH_3)_2$, —$SCH_3$, —CN, aryl and heteroaryl, further wherein at least one of $R^1$ and $R^2$ is not hydrogen, and at least one of $R^1$ and $R^2$ is $(C_1$-$C_{12})$ linear or branched alkyl or alkenyl substituted with —OH, —SH, —COOH or —$NH_2$, or $R^1$—C—$R^2$ together form a ring structure selected from $(C_3$-$C_{10})$cycloalkyl, aryl and heteroaryl, unsubstituted or substituted with one or more substituents selected from the group consisting of halo, nitro, trifluoromethyl, trifluoromethoxy, methoxy, carboxy, —$NH_2$, —OH, —SH, —$NHCH_3$, —$N(CH_3)_2$, —$SCH_3$, —CN, $(C_1$-$C_6)$alkyl, and substituted $(C_1$-$C_6)$alkyl, and $Z^1$ is selected from the group consisting of —COOH, —$SO_3H$, —$SO_2H$, —$OSO_3H$, —$PO_3H_2$, —$OPO_3H_2$, and —OSi(R')(R")OH, wherein R' and R" are independently H or $(C_1$-$C_{12})$ linear or branched alkyl or alkoxy. In some embodiments, the asphalt binder additive composition further comprises a surfactant.

In yet another aspect, the present invention provides an asphalt binder additive composition comprising a carrier matrix and a masked curing agent, wherein the masked curing agent comprises

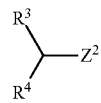

wherein each $R^3$ and $R^4$ is independently selected from the group consisting of hydrogen or ($C_1$-$C_{18}$) linear or branched alkyl or alkenyl, wherein each ($C_1$-$C_{18}$) linear or branched alkyl is unsubstituted or substituted with 1 or more substituents selected from the group consisting of halo, nitro, trifluoromethyl, trifluoromethoxy, methoxy, carboxy, —NH$_2$, —OH, —SH, —NHCH$_3$, —N(CH$_3$)$_2$, —SCH$_3$, —CN, aryl and heteroaryl, further wherein at least one of $R^3$ and $R^4$ is not hydrogen, and at least one of $R^3$ and $R^4$ is ($C_1$-$C_{12}$) linear or branched alkyl or alkenyl substituted with —OH, —SH, —COOH or —NH$_2$, or $R^1$—C—$R^4$ together form a ring structure selected from ($C_3$-$C_{10}$)cycloalkyl, aryl and heteroaryl, unsubstituted or substituted with 1 or more substituents selected from the group consisting of halo, nitro, trifluoromethyl, trifluoromethoxy, methoxy, carboxy, —NH$_2$, —OH, —SH, —NHCH$_3$, —N(CH$_3$)$_2$, —SCH$_3$, —CN, ($C_1$-$C_6$)alkyl, and substituted ($C_1$-$C_6$)alkyl, and $Z^2$ is selected from the group consisting of —COOR, —SO$_3$R, —SO$_2$R—OSO$_3$R, —PO$_3$HR, —OPO$_3$HR, and —OSi(R'XR")OR where R' and R" are independently H or ($C_1$-$C_{12}$) linear or branched alkyl or alkoxy, and further wherein R is ($C_1$-$C_{12}$) linear or branched alkyl. In some embodiments, the asphalt binder additive composition further comprises a surfactant.

In a further aspect, the present invention provides an asphalt binder composition comprising: an asphalt binder, a carrier matrix, and an agent selected from the group consisting of a curing agent and a masked curing agent.

In a yet further aspect, the present invention provides an asphalt mixture composition comprising a recycled material selected from the group consisting of reclaimed asphalt pavement (RAP) and recycled asphalt shingles (RAS), a carrier matrix, and an agent selected from the group consisting of a curing agent and a masked curing agent.

In still another aspect, the present invention provides a method for improving or enhancing the paving or re-paving of asphalt mixture to road surfaces comprising combining an asphalt binder with an asphalt binder additive composition comprising (a) a carrier matrix; and (b) an agent selected from the group consisting of a curing agent and a masked curing agent.

The following embodiments, aspects and variations thereof are exemplary and illustrative, and are not intended to be limiting in scope.

DETAILED DESCRIPTION OF THE INVENTION

Definitions

Figure 1:
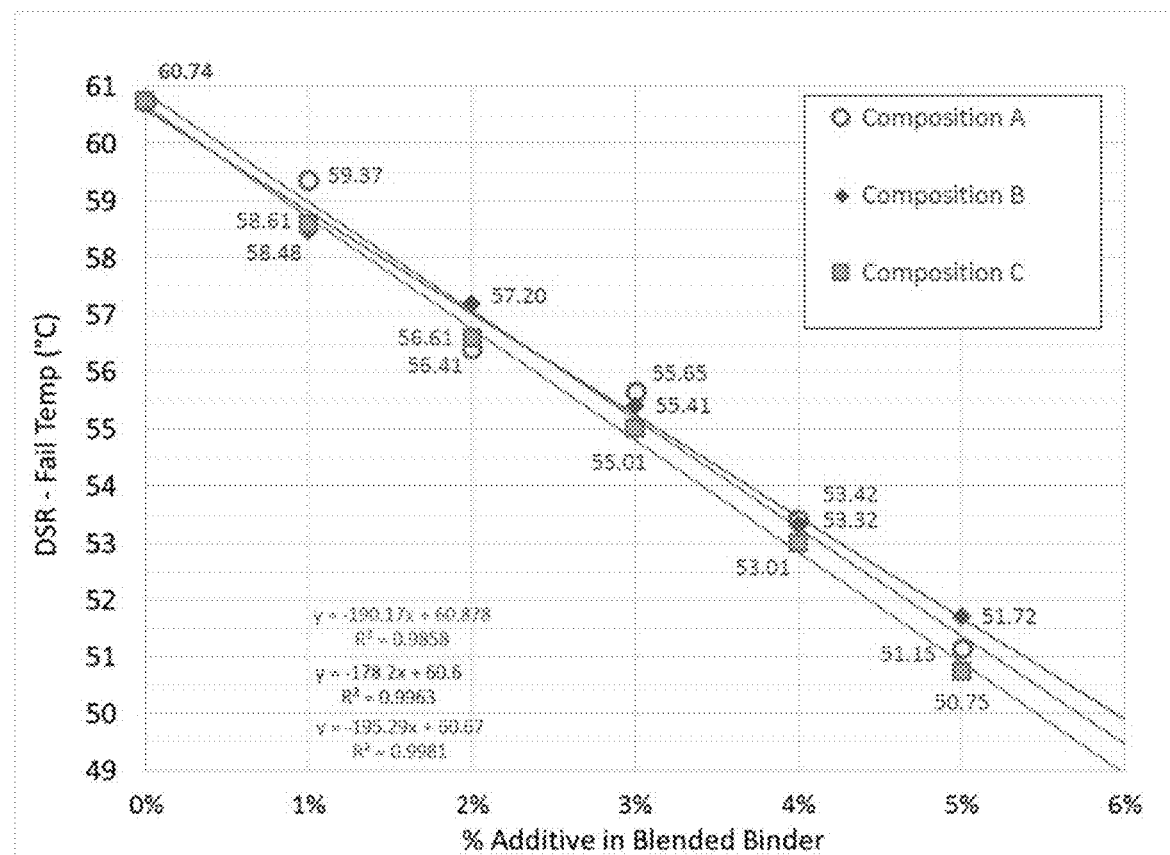
FIG. 1 shows the fail temperature of blended binders containing PG58-28 and admixed Composition A, B, or C plotted as a function of % w/w total binder.

Unless specifically noted otherwise herein, the definitions of the terms used are standard definitions used in the arts of organic synthesis and civil engineering. Exemplary embodiments, aspects and variations are illustrated in the figures and drawings, and it is intended that the embodiments, aspects and variations, and the figures and drawings disclosed herein are to be considered illustrative and not limiting.

As used herein, "asphalt binder" refers to liquid asphalt binder, also called bitumen or liquid asphalt. Asphalt binder does not contain aggregate. However, recycled asphalt mixtures such as reclaimed or recycled asphalt pavement (RAP) or recycled asphalt shingles (RAS) contain both aggregate and asphalt binder. Accordingly, "asphalt binder", as used herein, may be comprised partially or entirely of asphalt binder in the form of RAP or RAS.

As used herein, "aggregate" refers to substances such as crushed stone, sand, gravel, or to the aggregate component of RAP or RAS. Aggregate may be virgin aggregate or reclaimed, recovered or recycled aggregate.

As used herein, "asphalt mixture" refers to a mixture of asphalt binder (as defined above) and aggregate. Asphalt mixture is the material that is actually applied to surfaces (e.g., roads, driveways, playgrounds, etc.) for paving, etc. Asphalt mixture may also be used in the construction of asphalt shingles, or any other construction material that may require asphalt mixtures. Asphalt mixture may be virgin asphalt mixture or reclaimed, recovered or recycled asphalt mixture.

As used herein, "carrier matrix" refers to a substrate that is used to incorporate the improved asphalt binder of this invention to the asphalt mixture. The carrier matrix may be an oil, an oil-in-water emulsion, or a solid.

As used herein, a "curing agent" is a substance that contributes to the rejuvenation or "warm mix" properties of the invention.

As used herein, "masked curing agent" is a substance that is capable of transforming into a curing agent during the process of rejuvenation or warm mix formation or application of an asphalt mixture.

As used herein, "warm mix asphalt" (WMA) and "hot mix asphalt" (HMA) preparation refers to two different methods of preparing asphalt mixtures. As used herein, WMA preparation refers to the production of asphalt mixtures at temperatures below 300° F. In a preferred embodiment of this invention, the WMA preparation is carried out below 275° F., more preferably between 240-270° F. Alternatively, WMA preparation may refer to a preparation wherein the production temperature is reduced by 50° F. below that of the standard HMA preparation temperature. The use of WMA can reduce paving costs, extend the paving season into cooler seasons, improve asphalt compaction, allow asphalt mixture to be hauled longer distances (because the mixture can cool to a lower temperature prior to compaction), and improve working conditions by reducing exposure to fuel emissions, fumes, and odors.

MODES OF CARRYING OUT THE INVENTION

Asphalt Binder Additives

The present invention provides asphalt binder additive compositions that are useful in, among other things, helping to rejuvenate recycled, reclaimed or recovered asphalt mixtures and/or asphalt binders, permitting asphalt mixture preparation at more suitable temperatures (i.e., "warm mix" instead of "hot mix"), improving the performance grade of the asphalt mixture, or aiding compaction of asphalt mixtures by reducing the number of air voids in the mixture.

These additive compositions comprise a carrier matrix, and a curing agent or a masked curing agent or both. The asphalt binder additives of the claimed invention may be used for multiple purposes. Fundamentally, the asphalt binder additives may be used to: (1) rejuvenate reclaimed, recovered or recycled asphalt binders or asphalt mixtures such as RAP and RAS; or (2) permit or increase availability of warm mix asphalt (WMA) preparation.

A. Carrier Matrices.

The carrier matrix useful in the present invention is a substrate that is used to incorporate the improved asphalt binder of this invention to the asphalt mixture. The carrier matrix may be an oil, an oil-in-water emulsion, or a solid. Liquid carrier matrices of the present invention may solvate the curing agent and/or the masked curing agent, and facilitate the mixing and interaction of the curing agent and/or masked curing agent with the asphalt binders or mixtures.

Preferred carrier matrix oils are organic oils such as paraffinic oils or waxes, aromatic oils such as hydrolene, canola oil, coconut oil, linseed oil, safflower oil, soybean oil, tall oil, or tung oil, or inorganic oils such as mineral oils or silicone oils, or mixtures thereof.

Preferred carrier matrix oil-in-water emulsions are water emulsions of the above oils. These water emulsions may be 1 to 80% oil, 5 to 50% oil, or 10 to 25% oil. In some embodiments, the water emulsions are 10% or 20% oil. A preferred emulsion is a linseed oil in water emulsion.

Preferred solid carrier matrices are lignin, rubber, or silicaceous materials such as silica.

B. Curing Agents.

The curing agents useful in the present invention are substances that contribute to the rejuvenation or "warm mix" properties of the invention. Preferred curing agents of this invention have the general structure:

wherein each $R^1$ and $R^2$ is independently selected from the group consisting of hydrogen or $(C_1$-$C_{18})$ linear or branched alkyl or alkenyl, wherein each $(C_1$-$C_{18})$ linear or branched alkyl or alkenyl is unsubstituted or substituted with one or more substituents selected from the group consisting of halo, nitro, trifluoromethyl, trifluoromethoxy, methoxy, carboxy, —$NH_2$, —OH, —SH, —$NHCH_3$, —$N(CH_3)_2$, —$SCH_3$, —CN, aryl and heteroaryl, further wherein at least one of $R^1$ and $R^2$ is not hydrogen, and at least one of $R^1$ and $R^2$ is $(C_1$-$C_{12})$ linear or branched alkyl or alkenyl substituted with —OH, —SH, —COOH or —$NH_2$, or $R^1$—C—$R^2$ together form a ring structure selected from $(C_3$-$C_{10})$cycloalkyl, aryl and heteroaryl, unsubstituted or substituted with one or more substituents selected from the group consisting of halo, nitro, trifluoromethyl, trifluoromethoxy, methoxy, carboxy, —$NH_2$, —OH, —SH, —$NHCH_3$, —$N(CH_3)_2$, —$SCH_3$, —CN, $(C_1$-$C_6)$alkyl, and substituted $(C_1$-$C_6)$alkyl, and $Z^1$ is selected from the group consisting of —COOH, —$SO_3$H, —$SO_2$H, —$OS_3$H, —$PO_3H_2$, —$OPO_3H_2$, and —OSi (R'XR")OH, wherein R' and R" are independently H or $(C_1$-$C_{12})$ linear or branched alkyl or alkoxy.

The asphalt binder additive compositions of the invention, when containing a curing agent, may be 1 to 50% (w/w) curing agent, more preferably 1 to 25% curing agent, most preferably 1 to 5% curing agent.

In particularly preferred embodiments of this invention the curing agent is selected from ascorbic acid, benzoic acid, pthalic acid, cinnamic acid, citric acid, 2-pyridine carboxylic acid, salicylic acid and stearic acid.

C. Masked Curing Agents.

The masked curing agents useful in the present invention are substances that are capable of transforming into curing agents during the process of rejuvenation or warm mix formation or application. Preferred masked curing agents of this invention have the general structure

wherein each $R^3$ and R' is independently selected from the group consisting of hydrogen or $(C_1$-$C_{18})$ linear or branched alkyl or alkenyl, wherein each $(C_1$-$C_{18})$ linear or branched alkyl is unsubstituted or substituted with 1 or more substituents selected from the group consisting of halo, nitro, trifluoromethyl, trifluoromethoxy, methoxy, carboxy, —$NH_2$, —OH, —SH, —$NHCH_3$, —$N(CH_3)_2$, —$SCH_3$, —CN, aryl and heteroaryl, further wherein at least one of $R^3$ and $R^4$ is not hydrogen, and at least one of $R^3$ and $R^4$ is $(C_1$-$C_{12})$ linear or branched alkyl or alkenyl substituted with —OH, —SH, —COOH or —$NH_2$, or $R^1$—C—$R^4$ together form a ring structure selected from $(C_3$-$C_{10})$cycloalkyl, aryl and heteroaryl, unsubstituted or substituted with 1 or more substituents selected from the group consisting of halo, nitro, trifluoromethyl, trifluoromethoxy, methoxy, carboxy, —$NH_2$, —OH, —SH, —$NHCH_3$, —$N(CH_3)_2$, —$SCH_3$, —CN, $(C_1$-$C_6)$alkyl, and substituted $(C_1$-$C_6)$alkyl, and $Z^2$ is selected from the group consisting of —COOR, —$SO_3$R, —$SO_2$R—$OSO_3$R, —$PO_3$HR, —$OPO_3$HR, and —OSi (R'XR")OR where R' and R" are independently H or $(C_1$-$C_{12})$ linear or branched alkyl or alkoxy, and further wherein R is $(C_1$-$C_{12})$ linear or branched alkyl.

The asphalt binder additive compositions of the invention, when containing a masked curing agent, may be 0.1 to 50% (w/w) masked curing agent, more preferably 0.1 to 25% masked curing agent, most preferably 0.1 to 5% masked curing agent.

In particularly preferred embodiments of this invention, the masked curing agent is methyl-, ethyl-, isopropyl- or hexyl salicylate.

D. Surfactants.

The surfactants useful in the present invention include, but are not limited to, hydrophilic surfactants, lipophilic surfactants, and mixtures thereof. That is, a mixture of hydrophilic surfactants may be employed, a mixture of lipophilic surfactants may be employed, or a mixture of at least one hydrophilic surfactant and at least one lipophilic surfactant may be employed.

Hydrophilic surfactants may be either ionic or non-ionic. Suitable ionic surfactants include, but are not limited to, alkylammonium salts; fusidic acid salts; fatty acid derivatives of amino acids, oligopeptides, and polypeptides; glyceride derivatives of amino acids, oligopeptides, and polypeptides; lecithins and hydrogenated lecithins; lysolecithins and hydrogenated lysolecithins; phospholipids and derivatives thereof; lysophospholipids and derivatives thereof; carnitine fatty acid ester salts; salts of alkylsulfates; fatty acid salts; sodium docusate; acylactylates; mono- and diacetylated tartaric acid esters of mono- and di-glycerides; succinylated mono- and di-glycerides; citric acid esters of mono- and di-glycerides; and mixtures thereof.

Within the aforementioned group, ionic surfactants include, by way of example: lecithins, lysolecithin, phospholipids, lysophospholipids and derivatives thereof; carnitine fatty acid ester salts; salts of alkylsulfates; fatty acid salts; sodium docusate; acylactylates; mono- and di-acetylated tartaric acid esters of mono- and di-glycerides; succinylated mono- and di-glycerides; citric acid esters of mono- and di-glycerides; and mixtures thereof.

Ionic surfactants may be the ionized forms of lecithin, lysolecithin, phosphatidylcholine, phosphatidylethanolamine, phosphatidylglycerol, phosphatidic acid, phosphatidylserine, lysophosphatidylcholine, lysophosphatidylethanolamine, lysophosphatidylglycerol, lysophosphatidic acid, lysophosphatidylserine, PEG-phosphatidylethanolamine, PVP-phosphatidylethanolamine, lactylic esters of fatty acids, stearoyl-2-lactylate, stearoyl lactylate, succinylated monoglycerides, mono/diacetylated tartaric acid esters of mono/diglycerides, citric acid esters of mono/diglycerides, cholylsarcosine, caproate, caprylate, caprate, laurate, myristate, palmitate, oleate, ricinoleate, linoleate, linolenate, stearate, lauryl sulfate, teracecyl sulfate, docusate, lauroyl carnitines, palmitoyl carnitines, myristoyl carnitines, and salts and mixtures thereof.

Hydrophilic non-ionic surfactants may include, but not limited to, alkylglucosides; alkylmaltosides; alkylthioglucosides; lauryl macrogolglycerides; polyoxyalkylene alkyl ethers such as polyethylene glycol alkyl ethers; polyoxyalkylene alkylphenols such as polyethylene glycol alkyl phenols; polyoxyalkylene alkyl phenol fatty acid esters such as polyethylene glycol fatty acids monoesters and polyethylene glycol fatty acids diesters; polyethylene glycol glycerol fatty acid esters; polyglycerol fatty acid esters; polyoxyalkylene sorbitan fatty acid esters such as polyethylene glycol sorbitan fatty acid esters; hydrophilic transesterification products of a polyol with at least one member of the group consisting of glycerides, vegetable oils, hydrogenated vegetable oils, fatty acids, and sterols; polyoxyethylene sterols, derivatives, and analogues thereof; polyoxyethylated vitamins and derivatives thereof; polyoxyethylene-polyoxypropylene block copolymers; and mixtures thereof; polyethylene glycol sorbitan fatty acid esters and hydrophilic transesterification products of a polyol with at least one member of the group consisting of triglycerides, vegetable oils, and hydrogenated vegetable oils. The polyol may be glycerol, ethylene glycol, polyethylene glycol, sorbitol, propylene glycol, pentaerythritol, or a saccharide.

Other hydrophilic-non-ionic surfactants include, without limitation, PEG-10 laurate, PEG-12 laurate, PEG-20 laurate, PEG-32 laurate, PEG-32 dilaurate, PEG-12 oleate, PEG-15 oleate, PEG-20 oleate, PEG-20 dioleate, PEG-32 oleate, PEG-200 oleate, PEG-400 oleate, PEG-15 stearate, PEG-32 distearate, PEG-40 stearate, PEG-100 stearate, PEG-20 dilaurate, PEG-25 glyceryl trioleate, PEG-32 dioleate, PEG-20 glyceryl laurate, PEG-30 glyceryl laurate, PEG-20 glyceryl stearate, PEG-20 glyceryl oleate, PEG-30 glyceryl oleate, PEG-30 glyceryl laurate, PEG-40 glyceryl laurate, PEG-40 palm kernel oil, PEG-50 hydrogenated castor oil, PEG-40 castor oil, PEG-35 castor oil, PEG-60 castor oil, PEG-40 hydrogenated castor oil, PEG-60 hydrogenated castor oil, PEG-60 corn oil, PEG-6 caprate/caprylate glycerides, PEG-8 caprate/caprylate glycerides, polyglyceryl-10 laurate, PEG-30 cholesterol, PEG-25 phyto sterol, PEG-30 soya sterol, PEG-20 trioleate, PEG-40 sorbitan oleate, PEG-80 sorbitan laurate, polysorbate 20, polysorbate 80, POE-9 lauryl ether, POE-23 lauryl ether, POE-10 oleyl ether, POE-20 oleyl ether, POE-20 stearyl ether, tocopheryl PEG-100 succinate, PEG-24 cholesterol, polyglyceryl-10 oleate, Tween 40, Tween 60, sucrose monostearate, sucrose monolaurate, sucrose monopalmitate, PEG 10-100 nonyl phenol series, PEG 15-100 octyl phenol series, and poloxamers.

Suitable lipophilic surfactants include, by way of example only: fatty alcohols; glycerol fatty acid esters; acetylated glycerol fatty acid esters; lower alcohol fatty acids esters; propylene glycol fatty acid esters; sorbitan fatty acid esters; polyethylene glycol sorbitan fatty acid esters; sterols and sterol derivatives; polyoxyethylated sterols and sterol derivatives; polyethylene glycol alkyl ethers; sugar esters; sugar ethers; lactic acid derivatives of mono- and di-glycerides; hydrophobic transesterification products of a polyol with at least one member of the group consisting of glycerides, vegetable oils, hydrogenated vegetable oils, fatty acids and sterols; oil-soluble vitamins/vitamin derivatives; and mixtures thereof. Within this group, suitable lipophilic surfactants include, but are not limited to, glycerol fatty acid esters, propylene glycol fatty acid esters, and mixtures thereof or are hydrophobic transesterification products of a polyol with at least one member of the group consisting of vegetable oils, hydrogenated vegetable oils, and triglycerides.

In some embodiments, the surfactant is selected from the group consisting of Span20®, Span60®, TritonX100®, Triton X305®, Mowiol 18-88®, (all Sigma-Aldrich, St. Louis, Mo.), Tween20® (Fisher Scientific, Fair Lawn, N.J.), Dowfax2A1®, Dowfax 8390® (both The Dow Chemical Co., Midland, Mich.), Surfynol 104A®, Surfynol DF62®, Dynol 604 (all Air Products and Chemicals, Inc., Allentown, Pa.), Pluronic F108 Pastilles® (BASF Corp., Florham Park, N.J.), Aerosol A103® (Cytec Industries, Inc., Woodland Park, N.J.), lecithin, dodecyl benzene sulfonic acid sodium salt and gum Arabic. In some embodiments, the surfactant is Tween20®.

The asphalt binder additive compositions of the invention, when containing a surfactant, may be 0.1 to 5% (w/w) surfactant, more preferably 0.1 to 1% surfactant. In some embodiments, the asphalt binder additive composition of the invention is 0.5% surfactant. In some embodiments, the asphalt binder additive composition of the invention is 0.5% Tween20® or 1% Tween20®.

E. Methods of Making and Using Emulsions.

When the carrier matrix is an emulsion, the asphalt binder additive composition may be produced using processes such as paddle mixing or stirring, sonication, a Sonolator® (Sonic Corporation, Stratford, Conn.) or a single piston pump. Large scale production of such compositions may employ single or multiple streams of the components (and an optional surfactant) converging under increased pressure, then exiting the equipment as a single stream of product. Such emulsions are mainly produced at ambient temperatures, but elevated temperatures may also be used.

When the carrier matrix is an emulsion, the asphalt binder additive composition may be used by applying directly to the surface of existing asphalt pavement. When employed in this fashion, pavement is preserved by preventing onset of the top down cracking that is common in aged pavement, thereby extending the life of existing asphalt pavement.

When employed in this fashion, the asphalt binder additive composition is applied at at a dose rate from 0.01 to 0.2 gallons/sq.yd.

Asphalt Binders

The asphalt binders used herein are liquid asphalt binders. These are also often called bitumen or liquid asphalt. Asphalt binder does not contain aggregate. Asphalt binder can be any emulsifiable asphalt known in the art. Asphalt binder can be naturally occurring or manufactured. Manufactured asphalt binder is often the residual product of the nondestructive distillation of crude oil in petroleum refining.

The asphalt binders used herein can meet any roadway specification known in the art (including but not limited to, for example, ASTM International specifications), can be acquired from any region (including but not limited to, for example, any Petroleum Administration Defense District (PADD) such as PADD 1, PADD2, etc.), and can be acquired from any refiner or supplier (including but not limited to, for example, BP, Calumet, Cenex, Conoco Phillips, Exxon/Mobil, Holly, Imperial, Marathon, Paramount, San Joaquin, Shell, Sinclair, Suncor, Tesoro, US Oil, and Valero). The asphalt binder may include naturally occurring bitumens, naturally occurring bituminous materials (such as gilsonite and gilsonite derivatives), or it can be produced by crude oil or petroleum pitches (such as asphalt) produced during cracking process and coal tar or blends of bituminous materials. The asphalt binder may also conform to specification of viscosity graded and/or penetration graded bitumens.

The asphalt binder may also include other components that may be considered as "grade extenders" or "modifiers." Components which are traditionally added to bitumen to produce a modified asphalt binder meeting performance-grade standards are suitable for use in certain embodiments of the present invention. Such additives include, but are not limited to, natural rubbers, synthetic rubbers, plastomers, thermoplastic resins, thermosetting resins, elastomers, and combinations thereof. Examples of these additives include styrene-butadiene-styrene (SBS), styrene-butadiene rubber (SBR), poly-isoprene, polybutylenes, butadiene-styrene rubbers, vinyl polymers, ethylene vinyl acetate, ethylene vinyl acetate derivatives, and the like. The asphalt binder of the present invention can also contain recycled crumb rubber from recycled tires, or recycled engine oil bottoms (REOB). In certain embodiments, the modified bitumen can contain at least one member selected from the group consisting of sulfur, sulfur-containing crosslinkers, acid modifiers such as tall oil acids, tall oil pitches, phosphoric or polyphosphoric acid derivatives and combinations thereof. It is well within the ability of a skilled artisan to produce asphalt binders containing the noted additives.

Aggregates

The aggregates useful in the present invention are substances such as crushed stone, sand, gravel, RAP or RAS (RAP and RAS generally also contain asphalt binders). The aggregates of the present invention may be virgin aggregates, reclaimed aggregates, recovered aggregates or recycled aggregates.

Aggregates used in paving materials and road construction are derived from natural and synthetic sources. The aggregates may be selected for individual asphalt applications (whether paving, shingles or otherwise) based on a number of criteria, including physical properties, compatibility with the asphalt binder to be used in the process, availability, and ability to provide a finished product that meets the performance specifications of the project (for example, layer thickness for the traffic projected over the design life of a paving project).

Gradation, which refers to the percent of aggregate particles of a given size, is important for asphalt paving. There are three common gradations: dense-graded, gap-graded and open-graded. Dense-graded aggregate exhibit the greatest mineral surface area (per unit of aggregate). Open-graded aggregate largely consist of a single, large-sized (e.g. around 0.375 to 1.0 inch) stone with very low levels (typically less than about two percent of the total aggregate) of fines (material less than 0.25 inch) or filler (mineral material less than 0.075 mm). Gap-graded aggregate fall between dense-graded and open-graded classes. RAP material generally reflects the gradation of the pavement from which the reclaimed material was obtained. If the original pavement was a dense-graded mix, the RAP generally will also be dense graded. Any aggregate which is traditionally employed in the production of paving compositions is suitable for use in certain embodiments of the present invention, including dense-graded aggregate, gap-graded aggregate, open-graded aggregate, stone-matrix asphalt, recycled asphalt paving, and mixtures thereof.

Reclaimed or Recycled Asphalt Pavement (RAS) and Recycled Asphalt Shingles (RAS)

Reclaimed or recycled asphalt pavement (RAP), contains asphalt binder and one or more aggregates, and can be used as an aggregate in the compositions and methods of the present invention. A common method is to combine RAP with virgin asphalt binder and aggregate in either a continuous plant (Drum) or batch (Pug Mill) central mixing plant to produce new pavement mixtures. In the United States these combined mixtures are generally restricted to a maximum content of about 50%, more commonly from 10% to about 25% of "RAP" due to a decrease in pavement performance as the RAP content is increased.

RAP is an asphalt mixture paving material that has been removed from a paved surface. Asphalt paving material can be removed from a paved surface by any process known in the art including, but not limited to, rotomilling, scraping and scarifying. RAP contains asphalt and one or more aggregates. Often the asphalt and aggregates have undergone various physical changes during construction and service. RAP can be reprocessed and reused in new asphalt materials.

RAP can be fractionated by crushing and selecting particles below a specific particle size. For example, RAP can be fed into a small impact crusher, and the resulting material can be sent across one or more sieves or screens to separate out particles above a specific size. Oversized material can be returned to the crusher and crushed again. Alternatively, RAP can be screened before being crushed.

RAP can be selected to include only RAP particles having a specific size. In some embodiments, the RAP passes through a 38.1-mm (1½-inch) sieve. Alternatively, a 31.75-mm (1¼-inch) sieve, a 25.4-mm (1-inch) sieve or a 19.0-mm (¾-inch) sieve can be used. These result in RAP particles having less than 1½ inches in diameter, less than 1¼ inches in diameter, less than 1 inch in diameter or less than ¾ inch in diameter, respectively.

RAS is available from two distinct sources: Manufactured Shingle Waste (MSW) and Post-Consumer Asphalt Shingles (PCAS). PCAS is commonly referred to as "tear offs" and consists of shingles that had been placed onto roofs and exposed to the harsh elements of weathering for many years. MSW has not been placed onto roofs and likely has significantly less exposure to the elements of weathering. Generally, pavements (or shingles) incorporating limited amounts of RAP and RAS have performed similarly to pavements (or shingles) designed with only virgin materials.

Asphalt Mixtures and Methods of Making

Asphalt mixtures are generally prepared by combining asphalt binder with aggregate. Virgin asphalt mixture is usually prepared by adding virgin asphalt binder to heated virgin aggregate. Recycled, reclaimed or recovered ("old") asphalt mixtures contain "old" asphalt binder and "old" aggregate. The "old" asphalt binder can be separated from the "old" aggregate and used alone, but will contribute to the total amount of asphalt binder in the final composition whether or not it is separated. Thus, the final composition of an asphalt mixture that includes recycled materials may include recycled asphalt binder (with or without virgin asphalt binder), virgin aggregate and/or recycled aggregate.

In the methods of the invention, improved asphalt mixtures comprising an asphalt binder additive as disclosed herein, an asphalt binder and an aggregate are prepared. There are several methods by which the mixtures can be prepared:
  a. The asphalt binder additive may be added directly to the asphalt binder prior to mixing with an aggregate. For example, the asphalt binder additive is first mixed with virgin asphalt binder prior to mixing with virgin aggregate, RAP, RAS, or combinations thereof.
  b. The asphalt binder additive may be added directly to a virgin asphalt mixture. For example, virgin asphalt and virgin aggregate are combined, and then the asphalt binder additive is added to the mixture.
  c. The asphalt binder additive may be added directly to virgin aggregate prior to mixing with asphalt binder. However, this must be done vary carefully if the carrier matrix is an oil being added to superheated virgin aggregate.
  d. The asphalt binder additive may be added directly to a recycled, recovered or reclaimed asphalt mixture such as RAP and/or RAS. For example, the asphalt binder additive could be applied directly (preferably as a sprayed emulsion) to a torn-up road surface (essentially in situ-generated RAP) and re-paved immediately. In this embodiment, additional asphalt binder and aggregate may also be added before, after, or simultaneously with the asphalt binder additive.

The methods of the present invention may be performed as HMA or WMA. However, the use of the asphalt binder additives of the present invention greatly increases the availability of WMA over HMA, which can reduce paving costs, extend the paving season into cooler seasons, improve asphalt compaction, allow asphalt mixture to be hauled longer distances (because the mixture can cool to a lower temperature prior to compaction), and improve working conditions by reducing exposure to fuel emissions, fumes, and odors.

Hot in-place recycling (HIPR) involves the in-place removal, rejuvenation, and replacement of the top 1-inch (25 mm) of the pavement. Remixing involves the use of some new aggregate as well as additional virgin asphalt binder combined in a Pug Mill, allowing for the placement of up to two inches of surface pavement. Three basic processes are recognized by the Asphalt Recycling and Reclaiming Association, "ARRA": 1. heater-scarification (multiple pass), 2. repaving (single pass), and 3. remixing. The asphalt binder additives of the present invention may be added at any point in a HIPR process. The primary advantage of in-place recycling is cost savings. Stockpiling RAP is not necessary so there is no need to transport large quantities of milled old pavement. The quantity of new materials is also substantially reduced.

EXPERIMENTAL

While a number of exemplary embodiments, aspects and variations have been provided herein, those of skill in the art will recognize certain modifications, permutations, additions and combinations and certain sub-combinations of the embodiments, aspects and variations. It is intended that the following claims are interpreted to include all such modifications, permutations, additions and combinations and certain sub-combinations of the embodiments, aspects and variations are within their scope. The entire disclosures of all documents cited throughout this application are incorporated herein by reference.

Example 1

Preparation of Compositions A, B and C

Composition A consists of 1 wt % salicylic acid and 99 wt % linseed oil. In a typical preparation of Composition A, Raw Linseed Oil (6.5 pounds, density 7.78 lb/gal, 0.932 g/mL) was weighed into a gallon can. Salicylic acid (32 g) was added while the mixture was being stirred with a Ross HSM-C.

Composition B, consisting of 2% salicylic acid, 0.5% methyl salicylate, and 97.5% linseed oil, is prepared as above. The methyl salicylate was added to the mix of salicylic acid and linseed oil after all the salicylic acid has dissolved.

Composition C, consisting of 2% salicylic acid, 0.1% methyl salicylate, and 97.9% linseed oil, is prepared as above. The methyl salicylate was added to the mix of salicylic acid and linseed oil after all the salicylic acid has dissolved.

Example 2

Softening of Virgin and Reclaimed Asphalt Binders and Binder Blends

Compositions A and B were made as in Example 1. Virgin asphalt binders PG64-28, PG64-22, and PG58-28 were obtained. PG64-22 and PG58-28 are softer grade binders than PG64-28. Reclaimed Asphalt Pavement (RAP) was obtained from a crushed stone source in Wrentham, Mass. RAS was obtained as Post-Consumer Asphalt Shingles (PCAS) from an asphalt shingle recycling facility located in Fitchburg, Mass.

RAP and PCAS stockpile binders were each extracted and recovered in accordance with AASHTO T164 "Standard Method of Test for Quantitative Extraction of Asphalt Binder from Hot Mix Asphalt (HMA)", and AASHTO T170 "Standard Method of Test for Recovery of Asphalt Binder from Solution by Abson Method" (both from "Standard Specifications for Transportation Materials and Methods of Sampling and Testing", American Association of State Highway and Transportation Officials, Washington, D.C. 30th Edition, 2010, hereinafter "AASHTO Standards").

These extracted binders were combined with PG58-28 virgin binder at a given mixture ratio and with each asphalt rejuvenator at the pre-determined dosage to formulate each viscosity and binder grading test sample. Binder compositions are given in Table 1. In the nomenclature of Table 1, the Base Binder composition is given for virgin binder, extracted RAP binder, and extracted RAS binder (total 100%). The amount of Composition A, is determined as a wt % of the aged binder. Thus, for example, Binder composition B-6 is formulated by mixing 45 g of PG58-28, 50 g of Extracted RAP binder, 5 g of Extracted RAS binder, and 4.95 g of Composition A. The 4.95 g of Composition A constitutes an amount equal to 9% of the 55 g of total aged binder, which includes both the extracted RAP and extracted RAS binders.

The viscosity testing of each binder sample B-1 through B-8 was conducted in accordance with AASHTO T316 "Standard Method of Test for Viscosity Determination of Asphalt Binder Using Rotational Viscometer" (AASHTO Standards) using a Brookfield DVIII+bench top viscometer and thermosel with a SC4-21 spindle. Viscosity measurements of the virgin binders PG64-28 and PG58-28 and the blended mixture binders were taken at 135° C. (275° F.) and 165° C. (329° F.), with the results given in Table 1.

TABLE 1

Binder Compositions and Viscosities

| | Base Binder Composition (to total 100 wt %) | | Rejuvenator added | Average Viscosity (cP) | |
|---|---|---|---|---|---|
| | Virgin Pavement Grade Binder | Extracted RAP Binder (wt %) | Extracted RAS Binder (wt %) | to Base Binder Composition Composition A | at 135° F. | at 165° F. |
| B-1 | PG64-28 (100%) | NONE | NONE | NONE | 574.5 | 158.2 |
| B-2 | PG58-28 (100%) | NONE | NONE | NONE | 322.0 | 94.5 |
| B-3 | PG58-28 (100%) | NONE | NONE | 3.85% of PG58-28 | 197.0 | 66.5 |
| B-4 | PG58-28 (50%) | 50% | NONE | 9% of aged binder | 419.0 | 116.0 |
| B-5 | PG58-28 (45%) | 50% | 5% | NONE | 1622.0 | 348.5 |
| B-6 | PG58-28 (45%) | 50% | 5% | 9% of total aged binder | 947.0 | 217.6 |
| B-7 | PG58-28 (95%) | NONE | 5% | NONE | 614.0 | 155.4 |
| B-8 | PG58-28 (95%) | NONE | 5% | 9% of aged binder | 527.0 | 141.4 |

The data presented in Table 1 indicate that the addition of Composition A reduced the viscosity of virgin or blended binders.

The performance grade of the virgin binders (PG64-28, PG64-22, and PG58-28), extracted RAP binder and blended mixture binders were determined in accordance with AASHTO R29 "Grading or Verifying the Performance Grade of an Asphalt Binder" and AASHTO M320 "Standard Specification for Performance-Graded Asphalt Binder" (AASHTO Standards), with the results given in Table 2. (The extracted PCAS binder could not be graded due to its high stiffness.)

The data in Table 2 confirms that the virgin binders were at their stated PG grade. Addition of increasing amounts of Composition A or B to the virgin binders or to virgin/reclaimed binder blends reduced the continuous grade. The addition of Composition A or B may reduce the continuous grade sufficiently so as to reduce the performance grade. For example, Samples B-4 and B-10 demonstrate that the addition of Composition A at 9% (w/w of aged binder) to 50% PG58-28/50% Extracted RAP binder reduces the performance grade from PG70-22 to PG64-28.

Example 3

Softening of Virgin Binder with Concomitant Reduction in Binder Performance Grade Compositions A, B, and C were made as in Example 1. For each sample, approximately 50 g aliquot of virgin PG58-28 binder was weighed into a tared heat-proof container. The container was placed into a 1200 oven until the

TABLE 2

Performance Grading Results of Virgin, RAP, and Blended Binders

| | | Continuous Grade | | Performance Grade | |
|---|---|---|---|---|---|
| | Binder Composition | High Grade | Low Grade | High Grade | Low Grade |
| B-1 | PG64-28 (100%) | 68.08 | −30 | 64 | −28 |
| B-2 | PG58-28 (100%) | 60.63 | −33.91 | 58 | −28 |
| B-9 | 100% Extracted RAP binder | 82.01 | −21.79 | 82 | −16 |
| B-10 | 50% PG58-28/50% Extracted RAP binder | 71.81 | −26.7 | 70 | −22 |
| B-4 | 50% PG58-28/50% Extracted RAP binder/9.0% Composition A (w/w aged binder) | 65.1 | −32.87 | 64 | −28 |
| B-11 | 50% PG 58-28/50% Extracted RAP binder/9.0% Composition B (w/w aged binder) | 64.82 | −31.3 | 64 | −28 |
| B-1 | PG64-28 (100%) (repeat) | 67.4 | −30.3 | 64 | −28 |
| B-12 | PG64-28/1.0% Composition B (w/w binder) | 66.2 | −30.9 | 64 | −28 |
| B-13 | PG64-28/2.0% Composition B (w/w binder) | 64.1 | −32.5 | 64 | −28 |
| B-14 | PG64-22 (100%) | 67.6 | −26.5 | 64 | −22 |
| B-15 | PG64-22/1.0% Composition B (w/w binder) | 66.1 | −28.3 | 64 | −28 |
| B-16 | PG64-22/2.0% Composition B (w/w binder) | 63.6 | −30.2 | 58 | −28 | binder liquefied enough to make it soft enough to stir and pour readily. The binder was stirred, and a weighed amount of Composition A, B, or C added into the container, then stirred until thoroughly mixed, and the container returned to the 120° oven. The sample was then removed from the oven, stirred again, and then poured into the mold for Dynamic Shear Rheometer (DSR) samples. A cooled sample was typically placed in a freezer for approximately 1 min to aid in de-molding just prior to placing the sample on the DSR instrument plate. DSR was run using standard methods on a TA Instruments AR2000ex, and G*/sin δ used to determine the theoretical failure temperature. One sample at a time was poured into the mold for DSR testing, with the next sample poured and cooled in the DSR mold during the time the DSR was being run on the previous sample.

The additive percentage of Composition A, B, or C in FIG. 1 is given as a weight percentage of the total mixture content. For example, a sample consisting of 4% Composition C was formulated with 51.03 g of PG58-28 to which 2.126 g of Composition C was added, resulting in a total weight of 53.156 g, or 4% Composition C in the total binder blend.

The blend of virgin PG58-28 with Composition A, B, or C softens the binder as compared to PG58-28 alone. The addition of Composition A, B, or C reduces the fail temperature (corresponding to the high temperature of a continuous grade determination). Performance grading is specified at 6° C. intervals, so reduction of the continuous grade below 58° C. corresponds to a high-temperature performance grade of PG52. By interpolation, FIG. 1 shows that a binder blend comprised of approximately 1.3-1.5% (w/total w) Composition A, B, or C results in a continuous performance grade below 58° C., and therefore a high-temperature performance grade PG52. A binder blend comprised of approximately 2.8-3.3% (w/total w) Composition A, B, or C results in a reduction in the continuous performance grade by 6° C. For this particular PG58-28, that 6° C. reduction results in a margin of safety of 3° C. below the upper range of the PG52 performance grade. In general, a reduction of the continuous grade by 6° C. would result in a reduction in the performance grade to the next lowest level.

Example 4

Rejuvenation of Reclaimed Asphalt Pavement (RAP) or Recycled Asphalt Shingle (RAS) in Asphalt Mixtures Virgin stone aggregates were obtained from a crushed stone source in Wrentham, Mass. Two aggregate stockpiles were obtained: 9.5 mm crushed stone, and stone dust. Sieve analysis was completed in accordance with American Association of State Highway and Transportation Officials (AASHTO) test method T11 "Standard Method of Test for Materials Finer Than 75-μm (No. 200) Sieve in Mineral Aggregates by Washing" and T27 "Standard Method of Test for Sieve Analysis of Fine and Coarse Aggregates" (AASHTO Standards). Each virgin aggregate stockpile was tested, and the results are shown in Table 3.

The binder content of the RAP stockpile described in Example 2 was determined using an ignition oven in accordance with AASHTO T308 "Determining the Asphalt Binder Content of Hot Mix Asphalt (HMA) by the Ignition Method" (AASHTO Standards). The aggregates remaining in the post-ignition RAP were sieved to determine the size distribution of aggregates, given in Table 3, along with the aged binder content of the RAP, 5.6%.

The binder content of the PCAS stockpile described in Example 2, and the size distribution of the PCAS aggregates remaining post ignition were determined in the same manner as for the RAP. The size distribution of the PCAS aggregate and the aged binder content of the PCAS stockpile, 26.9%, are given in Table 3.

TABLE 3

Properties of Virgin Aggregate Stockpiles, Post Ignition RAP Aggregates, and Post Ignition PCAS Aggregates

| Sieve Size | Virgin 9.5 mm Stone | Virgin Stone Dust | RAP Post-Ignition Aggregates | PCAS Post-Ignition Aggregates |
|---|---|---|---|---|
| 19.0 mm | 100 | 100 | 100 | 100 |
| 12.5 mm | 99.4 | 100 | 100 | 100 |
| 9.5 mm | 93.8 | 100 | 100 | 100 |
| 4.75 mm | 29.7 | 99.7 | 76.8 | 100 |
| 2.36 mm | 5.2 | 83.7 | 57.6 | 99.4 |
| 1.18 mm | 2.8 | 57.1 | 43.3 | 80.8 |
| 0.600 mm | 2.3 | 38.6 | 31.1 | 56.3 |
| 0.300 mm | 2.1 | 24.9 | 19.8 | 48.7 |
| 0.150 mm | 1.8 | 15.9 | 12.1 | 39.2 |
| 0.075 mm | 1.5 | 10.9 | 8.3 | 28.5 |
| Binder Content of stockpile, (AASHTO T308) | | | 5.6% | 26.9% |

Table 4 shows the target gradation of aggregate sizes for the asphalt mixtures. The target gradation was developed to meet the requirements for a 9.5 mm Superpave mixture in accordance with AASHTO M323 "Superpave Volumetric Mix Design" and AASHTO R35 "Superpave Volumetric Design for Hot Mix Asphalt" (AASHTO Standards). The gradation was also designed to simultaneously meet Ohio DOT Specification Item 424 "Fine Graded Polymer Modified Asphalt Concrete Type B" also known as Smoothseal Type B (http://www.flexiblepavements.org/technical-resources/smoothseal/smoothseal Accessed Jul. 1, 2013). Table 4 shows gradation specifications for Superpave 9.5 mm and Ohio Smoothseal Type B.

TABLE 4

Target Aggregate Gradation and Specifications for Asphalt Mixtures

| Sieve Size (mm) | Sieve Size | Target Gradation | Superpave 9.5 mm Specification | Ohio Smoothseal Type B Specification |
|---|---|---|---|---|
| 19.0 mm | ¾" | 100 | — | — |
| 12.5 mm | ½" | 100 | 100 min | 100 |
| 9.5 mm | ⅜" | 98.0 | 90-100 | 95-100 |
| 4.75 mm | No. 4 | 85.0 | 90 max | 85-95 |
| 2.36 mm | No. 8 | 58.0 | 32-67 | 53-63 |
| 1.18 mm | No. 16 | 42.0 | — | 37-47 |
| 0.600 mm | No. 30 | 27.0 | — | 25-35 |
| 0.300 mm | No. 50 | 15.0 | — | 9-19 |
| 0.150 mm | No. 100 | 9.0 | — | — |
| 0.075 mm | No. 200 | 6.0 | 2-10 | 3-8 |
| Binder Content | | 6.5% | — | 6.4% min. |

The design Equivalent Single Axle Loads (ESALs) was selected as 0.3 to <3 million, which is consistent with surface course mixtures in New England. The design Superpave gyratory compactive effort for this ESALs level was Ndesign=75 gyrations.

Based on the ability of the Composition A and B rejuvenators to soften recovered RAP or recovered RAS aged binders, asphalt mixture compositions comprised of 50%

RAP, 50% RAP/5% PCAS, or 5% PCAS (the balance being virgin material) were selected for the recycled asphalt mixture compositions. Amounts of each of the virgin components (stone aggregate, stone dust, and binder) were then determined so as to meet the target aggregate size distribution and the design specification of 6.5 wt % of total binder. Aggregate size distribution was determined from the total of all components—RAS, PCAS, stone aggregate, and stone dust. The ratio of stone aggregate to stone dust in the virgin material is varied to meet the target size distribution. For example, in asphalt mixtures comprised of RAS, which has a larger fraction of smaller sized aggregates than virgin stone aggregate, the amount of stone dust added to the asphalt mixture will be reduced from that used in all virgin asphalt mixtures. Total binder includes both aged binder and virgin binder. The RAS and PCAS are not separated into binder and aggregate components when forming asphalt mixtures, therefore, the amount of aged binder in each asphalt mixture is determined from its wt % in the RAS or PCAS stockpiles and the wt % of the RAS and PCAS in the mixture.

In order to (a) eliminate moisture in the RAP and the PCAS stockpile materials and (b) optimize the blending between the aged and virgin binders in the asphalt mixtures, asphalt mixtures were prepared as follows: RAP and PCAS stockpiles were each air dried until a constant mass was achieved. RAP was then further dried for two days at 60° C. (140° F.). Virgin aggregate (stone and/or sand) was heated to mixing temperature. If RAP was used in the asphalt mixture, the RAP was added to the heated stone aggregate, and the RAP and virgin aggregate mixed and heated for a total of two hours prior to addition of the virgin binder. If PCAS was used in the asphalt mixture, the PCAS was added on top of the heated virgin aggregates or the virgin and RAP mixed aggregates for the last 5 minutes before the addition of virgin binder and mixing of all components. The virgin binder was added into a "well" or depression formed into the middle of the hot aggregate, allowed to warm briefly, and then all components were mixed thoroughly. Composition A, B, or C, if used, was added into the virgin binder in the "well" formed in the aggregate, and mixed with the virgin binder prior to thorough mixing of all components.

Control mixtures were prepared using virgin materials, at an asphalt mixture mixing temperature range of 161-165° C. (322-329° F.) and the compaction temperature was 153-157° C. (308-315° F.). The asphalt mixture mixing temperature for mixtures containing PG58-28 binder (including all RAP and PCAS containing mixtures) was 150° C. (300° F.), and the compaction temperature was 138° C. (280° F.).

Volumetric specimens of each asphalt mixture were batched, mixed and short-term aged at the appropriate compaction temperature for two hours in accordance with AASHTO R30 "Standard Practice for Mixture Conditioning of Hot Mix Asphalt (HMA)" (AASHTO Standards). After the short-term aging, specimens were compacted in the Superpave Gyratory Compactor (SGC).

The combined aggregate bulk specific gravity for each asphalt mixture was determined in accordance with AASHTO T84 "Standard Method of Test for Specific Gravity and Absorption of Fine Aggregate" and T85 "Standard Method of Test for Specific Gravity and Absorption of Coarse Aggregate" on three replicate specimens for each mixture (AASHTO Standards). For aggregate mixtures incorporating RAP and PCAS, the specimens were mixed at the appropriate temperatures and, prior to compaction, a sample was burned in the ignition oven in accordance with AASHTO T308. The aggregates remaining post ignition were then utilized to determine the combined bulk specific gravity of the aggregate mixture. Table 5 shows the specific gravity results.

TABLE 5

Combined Specific Gravity of Combined Aggregates

|  | Control 100% VM | 50% RAP | 5% PCAS | 50% RAP + 5% PCAS |
|---|---|---|---|---|
| Combined Aggregate Bulk Specific Gravity, Gsb (AASHTO T84/T85) | 2.571 | 2.544 | 2.558 | 2.564 |

Performance Testing

Volumetric properties of the Asphalt Mixtures were determined using AASHTO T166, "Bulk Specific Gravity of Compacted Asphalt Mixtures" and are shown in Table 6.

TABLE 6

Volumetric Properties of Asphalt Mixtures

| | Asphalt Mixture Composition | | | | | | | |
|---|---|---|---|---|---|---|---|---|
| | Control 100% VM | 50% RAP | 50% RAP | 50% RAP + 5% RAS | 50% RAP + 5% RAS | 5% RAS | 5% RAS | SPECIFICATION |
| Binder Type | PG64-28 | PG58-28 | PG58-28 | PG58-28 | PG58-28 | PG58-28 | PG58-28 | |
| % Total Binder, Base Mixture | 6.50% | 6.50% | 6.50% | 6.50% | 6.50% | 6.50% | 6.50% | |
| Rejuvenator | None | None | Composition A | None | Composition A | None | Composition A | |
| Rejuvenator Dose | — | — | 9% of aged binder | — | 9% of aged binder | — | 9% of aged binder | |
| Average Specimen Height (mm) | 118.1 | 118.1 | 117.8 | 121.1 | 119.1 | 119.9 | 120 | |
| Bulk Specific Gravity (Avg. Gmb) | 2.318 | 2.307 | 2.329 | 2.251 | 2.267 | 2.276 | 2.275 | |
| Max. Theo. Specific Gravity (Avg. Gmm) | 2.406 | 2.422 | 2.418 | 2.437 | 2.428 | 2.421 | 2.417 | |
| Average Air Voids (%) | 3.68 | 4.77 | 3.68 | 7.65 | 6.63 | 6.01 | 5.88 | 4.00% (within 0.50%) |
| Average Void in Mineral Aggregates (VMA) (%) | 15.7 | 15.3 | 14.4 | 18 | 17.3 | 16.9 | 16.9 | 15 min. |

TABLE 6-continued

Volumetric Properties of Asphalt Mixtures

| | Asphalt Mixture Composition | | | | | | | |
|---|---|---|---|---|---|---|---|---|
| | Control 100% VM | 50% RAP | 50% RAP | 50% RAP + 5% RAS | 50% RAP + 5% RAS | 5% RAS | 5% RAS | SPECIFICATION |
| Average Voids Filled with Asphalt (VFA) (%) | 76.6 | 68.7 | 74.5 | 57.4 | 61.7 | 64.4 | 65.1 | 65-78 |
| % Binder Absorbed (%) | 1.22 | 1.96 | 1.87 | 1.91 | 1.74 | 1.71 | 1.63 | — |
| % Binder Effective (Pbe %) | 5.36 | 4.67 | 4.75 | 4.71 | 4.87 | 4.9 | 4.98 | — |
| Dust to Binder Ratio | 1.12 | 1.3 | 1.26 | 1.27 | 1.23 | 1.22 | 1.2 | — |

The control mixture (100% virgin materials and a PG64-28 binder) met all mixture volumetric requirements. The 50% RAP, 5% PCAS and 50% RAP+5% PCAS mixtures did not meet the target volumetric with PG58-28 alone. However, the addition of Composition A rejuvenator improves the mixture volumetric properties. The 50% RAP mixture was improved to a level close to the control mixture, and met the specification of within 0.50% of 4.00% voids. The Voids in Mineral Aggregate (VMA) percentage for the 50% RAP mixtures with rejuvenator is slightly below the minimum of 15.0%, but within allowable production tolerances.

The 5% PCAS and 50% RAP+5% PCAS asphalt mixtures exhibit high air voids and VMA and VFA that are out of the specification range, possibly because the resultant binder is still too stiff and inhibits compaction or that the effective binder content is low because part of the RAP and/or PCAS binder is acting as a black rock. Addition of Composition A to the binder improved on the average air void, VMA and VFA for both the 5% PCAS and the 50% RAP+5% PCAS asphalt mixtures.

Rutting/Moisture Susceptibility Testing

Testing was conducted in accordance with AASHTO T324 "Hamburg Wheel-Track Testing of Compacted Hot-Mix Asphalt (HMA)" (AASHTO Standards). The test determines the failure susceptibility of a mixture due to weakness in the aggregate structure, inadequate binder stiffness, or moisture damage. The mixture is submerged in heated water and subjected to repeated loading from a 705N steel wheel. As the steel wheel loads the specimen, the corresponding rut depth of the specimen is recorded. The rut depth versus numbers of passes of the wheel is plotted to determine the Stripping Inflection Point (SIP). The SIP gives an indication of when the test specimen begins to exhibit stripping (moisture damage).

Gyratory specimens for this study were fabricated using the SGC to an air void level of 7.0±1.0% (as required by AASHTO T324). Testing in the Hamburg Wheel-Tracking Device (HWTD) was conducted at a test temperature of 50° C. (122° F.). The specimens were tested at a rate of 52 passes per minute after a soak time of 30 minutes at the test temperature. Testing was terminated at 20,000 wheel passes or until visible stripping was noted.

Table 7 shows the results for HWTD testing on asphalt mixtures after short term aging (STOA) and after long term aging (LTOA). Initial performance specimens were fabricated after short term aging the loose mixture for four hours at the compaction temperature, after which time the specimens were compacted and then tested in the HWTD within three days (STOA results). Long term aging specimens were similarly prepared, but then stored unwrapped for approximately three months at approximately 25° C., and then tested in the HWTD (LTOA results).

TABLE 7

Moisture Susceptibility/Rutting of Asphalt Compositions as determined by Hamburg Wheel Tracking Device (HWTD)

| | STOA | | | LTOA | | |
|---|---|---|---|---|---|---|
| Asphalt Mixture Composition | Stripping Inflection point | Maximum Rut Depth at 10,000 Passes (mm) | Maximum Rut Depth at 20,000 Passes (mm) | Stripping Inflection point | Maximum Rut Depth at 10,000 Passes (mm) | Maximum Rut Depth at 20,000 Passes (mm) |
| 100% virgin materials/PG64-28 | None | 0.76 | 1.39 | None | 1.99 | 2.72 |
| 100% virgin materials/PG58-28 | 5,900 | >20 | >20 | 12,000 | 3 | >20 |
| 50% RAP/50% virgin materials/PG58-28 | None | 1.09 | 1.80 | None | 0.91 | 1.45 |
| 50% RAP/PG58-28/9.0% Composition A (w/w aged binder) | 11,800 | 2.73 | 18.48 | — | — | — |
| 50% RAP/PG58-28/9.0% Composition B (w/w aged binder) | 8,500 | 7.61 | 20.04* | 13,600 | 1.92 | 5.2 |

*Test terminated at approximately 13,800 passes due to maximum rut depth exceeding 20 mm The all-virgin material control PG64-28 mixture (after STOA or LTOA) has minimal rutting at the 10,000 and 20,000 passes and has no inflection point. The same is true for 50% RAP mixture with binder PG58-28. Asphalt mixture containing Composition A or B results in increased rutting of the asphalt relative to the asphalt mixture without the Compositions (after STOA), as well as an inflection point in rut depth as a function of the number of passes. However, the rutting depth of the asphalt mixture containing Composition B, PG58-28, and 50% RAP after LTOA has been greatly reduced from that observed for the sample after STOA.

Fatigue Cracking

Four point bending beam fatigue tests were conducted on the mixtures following the AASHTO T321 procedure "Determining the Fatigue Life of Compacted Hot Mix Asphalt (HMA) Subjected to Repeated Flexural Bending" (AASHTO Standards).

Slabs with dimensions of 150 mm×180 mm×450 mm were fabricated for each mixture using the IPC Global Pressbox slab compactor. From each slab, beams with dimensions of 63 mm×50 mm×380 mm were cut such that the sides had smooth faces. The air voids of the final cut specimens were 7±1%. Beam specimens were conditioned at the test temperature of 15° C. (59° F.) for at least two hours prior to testing. A 15° C. (59° F.) test temperature was selected as representative of an intermediate temperature for the northeastern United States.

Each beam fatigue test was conducted in strain control mode at a loading frequency of 10 Hz applied using a sinusoidal waveform. Specimens were tested at strain levels of 250 microstrain (με), 500 με and 750 με. Initially, all mixtures were tested at 250 με. At this strain level, the 50% RAP mixture with Composition A or B reached over six million cycles with less than 20% loss in the initial stiffness measured at 50 cycles. Two higher strain levels were selected to achieve more than 10,000 cycles at failure. The 500 με and 750 με were selected because all mixtures lost 50 percent of their initial stiffness after at least 10,000 cycles. The number of cycles to failure was determined by fitting an exponential function to the flexural stiffness versus number of cycles and then evaluating the number of cycles that it took to decrease the initial stiffness by 50%.

Table 8 gives the testing results at the strain levels of 500 με and 750με. The 50% RAP mixture with the softer binder showed reduced fatigue performance at the 500 με strain level and marginally better performance at the 750 με strain level as compared to the virgin control mixture. Addition of Composition B improved the fatigue performance of the 50% RAP mixture relative to the control mixture.

TABLE 8

Results of Beam Fatigue Testing of Asphalt Mixture Specimens at 500 and 750 microstrain. All tests performed at 15° C.

| Asphalt Mixture Composition | STOA | | LTOA | |
|---|---|---|---|---|
| | 500 με Nf* | 750 με Nf* | 500 με Nf* | 750 με Nf* |
| 100% virgin materials/PG64-28 | 221,975 | 22,767 | 194,936 | 15,987 |
| 100% virgin materials/PG58-28 | 206,455 | 39,000 | 159,923 | 24,225 |
| 50% RAP/PG58-28 | 103,857 | 29,623 | 149,169 | 22,620 |
| 50% RAP/PG58-28/9% Composition B (w/w aged binder) | 374,952 | 68,402 | 458,291 | 55,125 |

*Nf = Number of Cycles to Failure

Low Temperature Cracking

To assess the effect of Compositions A and B on the low temperature cracking of the 50% RAP mixtures in comparison to the virgin control mixture, each mixture was tested in the Thermal Stress Restrained Specimen Test (TSRST) device in accordance with AASHTO TP10-93 (7).

In the TSRST test, the asphalt specimen is cooled at a constant rate (-10° C./hour) while its original length is held constant by the TSRST device. As the specimen gets colder it tries to contract but cannot which results in the accumulation of thermal stress. Eventually the thermal stress exceeds the tensile strength capacity of the specimen resulting in specimen fracture (crack). The temperature at which this fracture occurs is recorded and noted as the low cracking temperature of the mixture.

SGC specimens 185 mm (7.3 in) tall by 150 mm (5.9 in) in diameter were fabricated for each mixture. TSRST specimens were then cored and cut to a final height of 160 mm tall (6.3 in) by 54 mm (2.1 in) in diameter. The air voids of the final cut specimens were 7±1%.

Table 9 presents the results from the TSRST tests. The addition of Composition A to the 50% RAP asphalt mixture improves the cracking temperature of the asphalt mixture relative to the control (100% VM) asphalt mixture comprised of PG64-28 binder or to the 100% VM asphalt mixture comprised of PG58-28 binder. The minimum improvement is -2.9° C. and the maximum is -6.6° C. relative to the asphalt mixture comprised of PG64-28 binder. The minimum improvement relative to the asphalt mixture comprised of PG58-28 binder is -4.2° C. and the maximum is -8.1° C. These results indicate that Composition A at 9.0% (w/w aged binder) improves the low temperature cracking characteristics of similar mixtures comprised of up to 50% RAP.

TABLE 9

Thermal Stress Restrained Specimen Test of Asphalt Mixture Specimens

| | Temperature at Failure, ° C. | |
|---|---|---|
| Asphalt Mixture Composition | STOA | LTOA |
| 100% virgin materials/PG64-28 | -22.2 | -21.8 |
| 100% virgin materials/PG58-28 | -24.4 | -24.4 |
| 50% RAP/PG58-28 | -20.7 | — |
| 50% RAP/PG58-28 (duplicate) | -20.3 | -21.3 |
| 50% RAP/PG58-28/9.0% Composition A (w/w aged binder) | -27.0 | — |
| 50% RAP/PG58-28/9.0% Composition B (w/w aged binder) | -27.6 | -25.9 |

Reflective Crack Testing

The Texas Department of Transportation specification (Tex-248-F) for testing bituminous mixtures with Texas Overlay tester (OT) (National Center for Asphalt Technology (NCAT) "Effect of Changing Virgin Binder Grade and Content on RAP Mixture Properties—Research Synopsis 12-03", http://www.ncat.us/files/research-synopses/rap-durability.pdf, accessed Jul. 15, 2013) was used to evaluate the resistance of the mixtures to reflective cracking. Specimens were fabricated in the SGC and then trimmed. The air void level of the trimmed specimens was 7.0±1.0%.

All mixtures for this study were tested with a joint opening (displacement) of 0.06 cm (0.025 inch), test temperature 15° C. (59° F.), and a failure criteria of 93% reduction in the load measured during the first cycle or 1,200 cycles (whichever occurs first). Table 10 shows the average results of the testing; four samples per asphalt mixture were tested.

TABLE 10

Reflective Cracking of Asphalt Composites

| Asphalt Mixture Composition | Average Cycles to Failure |
|---|---|
| 100% virgin materials/PG64-28 binder | 13 |
| 50% RAP/PG58-28 | 22 |

TABLE 10-continued

Reflective Cracking of Asphalt Composites

| Asphalt Mixture Composition | Average Cycles to Failure |
|---|---|
| 50% RAP/PG58-28/9% Composition A (w/w aged binder) | 127 |
| 50% RAP/PG58-28/9% Composition B (w/w aged binder) | 258 |

This data shows that the addition of Composition A or B to asphalt composites dramatically improves cracking resistance, with the average cycles to failure increased by an order of magnitude from either asphalt composites comprised of virgin materials or comprised of 50% RAP.

Example 5

Reduction of Working Temperature of an Asphalt Mixture

Composition B was prepared as given in Example 1. Asphalt mixtures were prepared as given in Example 4. The control mixture consists of 50% RAP, 50% virgin materials, and virgin PG64-22 binder.

Workability evaluation was conducted using the Asphalt Workability Device (AWD) designed and built by University of Massachusetts Dartmouth Highway Sustainability Research Center (HSRC). The temperature of each asphalt mixture and the torque force on a mixing paddle was recorded while the asphalt mixture cooled under ambient conditions. The difference in torque force of two or more mixtures was used as a measure of the difference in workability between the mixtures.

Figure 2:
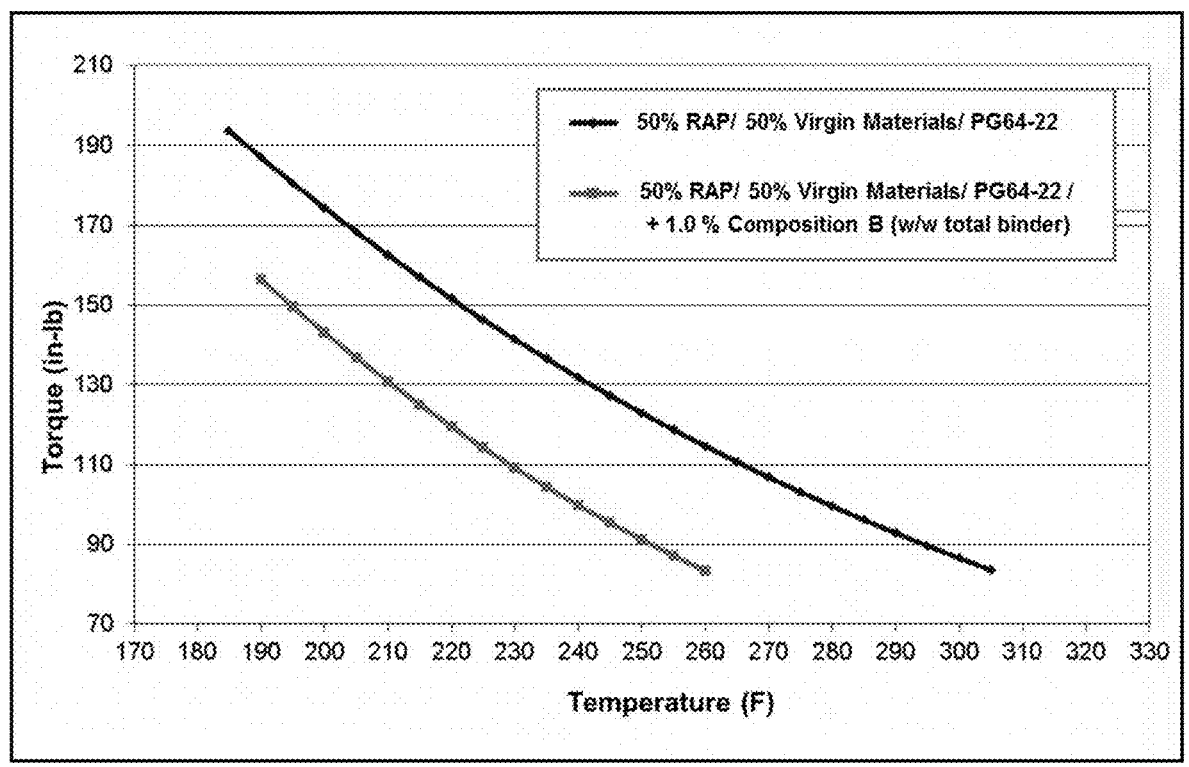
FIG. 2 plots torque force as a function of temperature for 50% RAP/50% virgin material/PG64-22 binder, and 50% RAP/50% virgin material/PG64-22 binder/1% Composition B (w/w total binder) asphalt mixtures. Both asphalt mixtures contain 6.50% total binder, and are designed to meet 9.5 mm Superpave specifications.

Workability of 50% RAP asphalt mixture and 50% RAP/1.0% Composition B asphalt mixture were evaluated using the AWD, with the results given in FIG. 2. Addition of 1% Composition B (w/w total binder) to the 50% RAP/50% virgin materials asphalt mixture reduced the working temperature by anywhere from 25° F. to 46° F. (in order to achieve the same torque force as recorded for the mixture without additive).

Example 6

Warm Mix Asphalt with Unconventionally High Recycled Content Prepared by Addition of Composition A Brox Industries (Dracut, Mass.) laid down a private residential driveway in Wilmington, Mass. with a hot mix asphalt (HMA) mixture to which Composition A had been added.

The HMA was produced in a total of ten batches with each batch having a total weight of 3 tons. Batches were kept deliberately below plant volume capacity to ensure complete mixing of components and to ensure that the mixing force capabilities of the plant were not exceeded given the high recycled content.

The base asphalt mixture comprised 55% virgin materials and 45% recycled content. The recycled content comprised 90 wt % RAP with 10 wt % RAS, with both RAP and RAS supplied by Brox Industries. The aged binder content of the 90/10 RAP/RAS blend was approximately 6.5%, of which 4.7% is derived from the RAP and 1.8% from the RAS.

The blended RAP/RAS content provided approximately 174 lbs of aged binder in each 3-ton batch of asphalt mixture. Virgin asphalt binder was added at 174 lbs per 3-ton batch, resulting in a total binder content of approximately 5.8% in the asphalt mixture. Composition A was added at the same time as the virgin binder into the asphalt mixture in an amount equal to 8% by weight of the aged binder, or approximately 14 lbs per 3-ton batch.

The pavement batches were transported in two trucks from the production facility to the paving site, a distance of approximately 16 miles. The air temperature was below freezing, a temperature conventionally regarded as too cold for laying pavement because the asphalt mixture cools so rapidly as to make it unworkable. The driveway pavement was laid down on prepared soil, in two sections seamed along the length of the driveway, and to a compacted pavement depth of 2 in using standard procedures. The 30 tons of asphalt mixture was laid and compacted without detriment or complications from the below freezing temperatures.

The driveway was used for 10 months subsequent to the lay-down, including the winter of 2013-14, with no observable rutting, potholing, cracks, fissures, component separation, or other water damage.

Example 7

A. Composition A as a Warm Mix Additive in Modified Top

A "0.5 Massachusetts Modified Top" was laid by Ted Ondrick Company on a stripped portion of Pine Street in Springfield, Mass. The asphalt mixture consisted of 10% RAP and 90% virgin materials. The asphalt mixture was prepared with PG64-22 virgin binder and 0.5% (w/w total binder) Composition A. A total of 21 tons of asphalt mixture was laid.

B. Composition A as a Warm Mix Additive in Modified Top

A "Superpave 9.5 mm mix" was laid by U.S. Pavement Services on top of a stripped portion of the Recycling Center driveway located at 169 Great Plain Avenue, Wellesley, Mass. On a per ton basis, the asphalt mixture consisted of 660 lbs ⅜ inch stone, 659 lbs stone sand, 500 lbs RAP, 100 lbs RAS, and 81 lbs virgin asphalt binder. RAP was estimated at between 5 and 6% aged binder. RAS was estimated at 24.3% aged binder content. Recovery of aged asphalt binder from the RAP/RAS was estimated to be 70%, resulting in a total estimated asphalt binder of 120 lbs, or 6% of the total weight. Composition A was added to the mix at an amount of 3.3 lbs per ton, by combining Composition A with the RAS two days prior to the preparation of the asphalt mixture. The asphalt mixture was prepared with PG64-28 virgin binder. Four truckloads of the mixture were transported from Benevento Companies (Wilmington, Mass.) to the paving site, a distance of approximately 28 miles. The load temperatures at the mixing plant were 250, 260, 275, and 275° F. for the four trucks. The first truckload of asphalt had a temperature of between 210 and 220° F. at the time of arrival at the paving site. All the asphalt mixture was laid and compacted without detriment or complications from the low temperature of the mix.

Example 8

Alternative Curing Agents

Additive compositions consisting of 1% curing agent and 99% linseed oil or 5% curing agent and 95% linseed oil were prepared similarly to the methods for preparation of Composition A in Example 1, using benzoic acid, phthalic acid, cinnamic acid, and citric acid as the curing agent.

Each additive composition was combined with PG64-22 asphalt binder at a level of 1% of the composition and 99% PG64-22. The PG64-22 was first heated in a 120° C. oven until fluid in a 4 oz. Deep Metal Tin. The measured amount of additive was added to the fluid binder, and the sample mixed by hand until uniform. Samples were mixed a minimum of three times with re-warming in between each mixing.

Samples for use in determining penetration depth were left in the 4 oz. tins and placed in a 120° C. oven for 60 minutes until the binder blend was fluid, then the samples were allowed to cool for 150 minutes. Penetration depth was determined using a Humboldt Manufacturing Company, Universal Penetrometer, Model H-1200 equipped with a 50 g weight, and Needle H-1280 (standard hardened stainless steel, 40-45 mm length, 2.5 g). Samples were then tested using standard procedures at 25° C.

After measuring penetration depth, a warmed fluid sample was prepared for Dynamic Shear Rheometer (DSR) by heating the asphalt binder blend, pouring a sample into a silicone mold, heating the sample in the mold at 120° C. for 30-40 minutes, and then cooling at ambient temperature for 30-40 minutes. DSR was then performed using standard methods on a TA Instruments AR2000ex, and the resulting $G^*/\sin \delta$ as a function of temperature used to determine the theoretical failure temperature.

Table 11 shows results for failure temperatures and penetration depths for the asphalt binder blends.

TABLE 11

Fail temperatures and penetration depth for blended asphalt binders. Compositions consist of 1% or 5% of the curing agent and with linseed oil carrier as the balance of the Composition. Compositions were added at 1% of final asphalt binder and Composition Blend.

| Binder | Curing Agent | DSR Failure Temperature (° C.) | Penetration depth ($1/10^{th}$ mm) |
|---|---|---|---|
| PG64-28 | (no additive) | not determined | 46 |
| PG64-22 | (no additive) | 68.61 | 43 |
| PG64-22 | 1% Salicylic Acid | 67 | 57 |
| PG64-22 | 5% Salicylic Acid | 59.12 | 129.7 |
| PG64-22 | 1% Benzoic Acid | 68.05 | 60.8 |
| PG64-22 | 5% Benzoic Acid | 59.77 | 132.3 |
| PG64-22 | 1% Phthalic Acid | 67.95 | 50.7 |
| PG64-22 | 5% Phthalic Acid | 60.05 | 132.7 |
| PG64-22 | 1% Cinnamic Acid | 67.83 | 58.3 |
| PG64-22 | 5% Cinnamic Acid | 59.65 | 120.3 |
| PG64-22 | 1% Citric Acid | 67.64 | 55 |
| PG64-22 | 5% Citric Acid | 59.91 | 120.2 |

The additive compositions of Table 11 soften the PG64-22 binder, as determined by reduction in the failure temperature and a greater penetration depth.

Example 9

Alternative Masked Curing Agents

Additive compositions consisting of 2% salicylic acid, 0.5% masked curing agent, and 97.5% linseed oil were prepared similarly to the methods for preparation of Composition B in Example 1, using ethyl salicylate or n-hexyl salicylate as the masked curing agent. Each composition was combined with PG64-22 asphalt binder at a level of 1% of the Composition and 99% PG64-22, and formed into samples as described in Example 8. Theoretical failure temperature from DSR and penetration depth were determined as described in Example 8 and the results given in Table 12.

TABLE 12

Fail temperatures and penetration depth for blended asphalt binders. Compositions consist of 2% salicylic acid, 0.5% masked agent, and 97.5% linseed oil, and are added at 1% of final asphalt binder and Composition Blend.

| Virgin Asphalt Binder | Masked Agent in Composition | DSR Failure Temperature (° C.) | Penetration Depth ($1/10^{th}$ mm) |
|---|---|---|---|
| PG64-22 GATX 211076 | (no additive) | 67.54 | 84 |
| PG64-22 GATX 211076 | Methyl Salicylate (Composition B) | 66.19 (−1.35) | 89.8 |
| PG64-22 GATX 211076 | Ethyl Salicylate | 65.34 (−2.2) | 95.8 |
| PG64-22 GATX 211076 | n-Hexyl Salicylate | 65.83 (−1.71) | 92.5 |

The additive compositions of Table 12 soften the binder, as determined by reduction in the failure temperature and a greater penetration depth. No significant difference between methyl salicylate, ethyl salicylate, or n-hexyl salicylate as the masked agent in the Compositions is observed at the tested level of 1% additive composition in the blended asphalt binder.

Example 10

Alternative Carriers

Additive compositions consisting of 1% salicylic acid and 99% carrier were prepared similarly to the methods for preparation of Composition A in Example 1, using walnut oil, soybean oil, sunflower oil, castor oil, and coconut oil as the carrier. Each additive composition was combined with PG64-22 asphalt binder at a level either of 1% of the additive and 99% PG64-22, or 5% of the additive and 95% PG64-22, and formed into samples as described in Example 8. Theoretical failure temperature from DSR and penetration depth were determined as described in Example 8 and the results are given in Table 13.

TABLE 13

Fail temperatures and penetration depth for blended asphalt binders. Compositions consist of 1% salicylic acid and 99% carrier, and are added at 1% or 5% of the final weight of the asphalt and Composition blend.

| Blend | Asphalt binder PG64-22 (g) | Composition Carrier | Carrier oil type | Composition mass (g) | Composition as wt % of final blend | DSR Failure Temperature (° C.) | Penetrometer Depth ($1/10^{th}$ mm) |
|---|---|---|---|---|---|---|---|
| PG64-22 (no blend) | | (no additive) | — | — | — | 67.54 | 56.5 |

TABLE 13-continued

Fail temperatures and penetration depth for blended asphalt binders. Compositions consist of 1% salicylic acid and 99% carrier, and are added at 1% or 5% of the final weight of the asphalt and Composition blend.

| Blend | Asphalt binder PG64-22 (g) | Composition Carrier | Carrier oil type | Composition mass (g) | Composition as wt % of final blend | DSR Failure Temperature (° C.) | Penetrometer Depth ($1/10^{th}$ mm) |
|---|---|---|---|---|---|---|---|
| A | 50.5  | Linseed oil    | Drying      | 0.51  | 1 | 63.63 | 71.5  |
| B | 55.09 | Linseed oil    | Drying      | 2.9   | 5 | 69.32 | 107.7 |
| C | 57.01 | Walnut oil     | Drying      | 0.57  | 1 | 62.67 | 69.7  |
| D | 53.55 | Walnut oil     | Drying      | 2.82  | 5 | 68.59 | 109.3 |
| E | 53.56 | Soybean oil    | Semi-drying | 0.54  | 1 | 62.06 | 73.3  |
| F | 57.08 | Soybean oil    | Semi-drying | 3     | 5 | —     | 110.7 |
| G | 48.27 | Sunflower oil  | Semi-drying | 0.488 | 1 | 65.29 | 70    |
| H | 51.51 | Sunflower oil  | Semi-drying | 2.71  | 5 | 70.33 | 100.7 |
| I | 51.07 | Castor oil     | Non-drying  | 0.51  | 1 | 64.91 | 54    |
| J | 59.76 | Castor oil     | Non-drying  | 3.14  | 5 | 70.49 | 114.7 |
| K | 54.96 | Coconut oil    | Non-drying  | 0.55  | 1 | 63.91 | 70.7  |
| L | 55.76 | Coconut oil    | Non-drying  | 2.93  | 5 | 55.13 | 87.3  |

The additives of Table 13 (as a 1% component of an asphalt binder blend) soften the binder, as determined by reduction in the failure temperature and a greater penetration depth.

Example 11

Alternative Carriers and Carrier Blends

Additive compositions were prepared as for the Compositions in Example 1, using tung oil (or a tung/linseed oil blend) as the carrier, salicylic acid as the curing agent, and methyl salicylate as the masked curing agent. Each additive composition was combined with PG58-28 asphalt binder at a level either of 1% of the additive and 99% PG58-28, or 5% of the additive and 95% PG58-28, and formed into samples as described in Example 8. Theoretical failure temperature from DSR and penetration depth were determined as described in Example 8 and the results are given in Table 14.

The additives of Table 14 (as a 1% or 5% component of an asphalt binder blend) soften the binder.

Example 12

Preparation of Emulsions

The following oil-in-water emulsions were prepared from Composition A: Emulsion D: 10% Composition A in 89% $H_2O$ plus 1% Tween 20®; Emulsion E: 20% Composition A in 79% $H_2O$ plus 1% Tween 20®; Emulsion F: 20% Composition A in 79.5% $H_2O$ plus 0.5% Tween 20®.

Example 13

Delta Mist/Delta S Field Trials

In the spring of 2018, Composition A and Emulsions D and E were applied to the surface of an area of asphalt,

TABLE 14

Fail temperatures and penetration depth for blended asphalt binders comprised of tung oil and PG58-28 asphalt binder.

| Blend | Carrier Oil | Carrier (wt % of Composition) | Salicylic Acid (wt % of Composition) | Methyl salicylate (wt % of Composition) | Composition as wt % of final blend | DSR Failure Temperature (° C.) | Penetrometer Depth ($1/10^{th}$ mm) |
|---|---|---|---|---|---|---|---|
| PG58-28 (no blend) | (none) | (no blend) | (no additive) | — | (no blend) | 60.74 | 115.8 |
| A | Tung | 100 | (no additive) | — | 1 | 59.07 | 137.8 |
| B | Tung | 100 | (no additive) | — | 5 | 53.20 | 254.7 |
| C | Tung | 99 | 1 | — | 1 | 58.67 | 158.2 |
| D | Tung | 99 | 1 | — | 5 | 52.53 | 297.7 |
| E | Tung | 97.5 | 2 | 0.5 | 1 | 59.06 | 162.3 |
| F | Tung | 97.5 | 2 | 0.5 | 5 | 53.06 | 290.7 |
| G | Tung | 97.9 | 2 | 0.1 | 1 | 59.16 | 134.5 |
| H | Tung | 97.9 | 2 | 0.1 | 5 | 52.54 | 249.5 |
| I | 50% Tung/ 50% Linseed | 100 | (no additive) | — | 5 | 51.39 | 296.7 |
| J | 50% Tung/ 50% Linseed | 99 | 1 | — | 5 | 52.33 | 290.5 |
| K | 50% Tung/ 50% Linseed | 97.5 | 2 | 0.5 | 5 | 51.90 | 296.5 |
| L | 50% Tung/ 50% Linseed | 97.9 | 2 | 0.1 | 5 | 52.34 | 295.5 | measuring approximately seventy feet long by approximately ten feet wide on an off-track surface mix specified under Mississippi DOT design in the North Paddock area of the National Center for Asphalt Technologies (NCAT) in Opelika, Ala. The overall area was broken into thirteen individual sections, labelled control north (CN), sections 1, 2, 3, 4, 5, 6, 7, 8, 9, 10, 11 and control south (CS). Each of these sections measure approximately ten feet long by three feet wide. Composition A was applied to sections 1 and 2. Emulsion D was applied to section 3 and 4. Emulsion E was applied to sections 5, 6, 7 and 11. Sections 8, 9 and 10 were omitted from this study as each one was exposed to excesses material due to overspray from neighboring applications. Applications were applied using an asphalt emulsion distribution truck, applying at spray rates ranging from 0.027-0.129 gallons per square yard.

Two six-inch diameter cores were collected from each section at two weeks, four weeks and twenty weeks post application to monitor the effects of Delta S on the aged asphalt binder. The results and data are shown in Tables 15-17.

A Dynamic Friction Tester (DFT) was used to collect coefficient of friction (μ) data at various speeds on sections 1, 2, 3, 4, 5, 6, 7, and 11 at pre-application, then twenty-four and ninety-six hours after application. The results are shown in Tables 18-19. Data collection and testing were all completed by NCAT.

TABLE 15

Two week cores.

| Section | Material | Rate, g/yd$^2$ | G*, kPa | Phase Angle (°) | Complex Visc, mPaS | Abs Viscosity, PaS | Corr Rate |
|---|---|---|---|---|---|---|---|
| CN 1st | N. Control | NA | 125.50 | 63.6 | 1.28E+07 | 100442 | 0.0000 |
| CN 2nd | N. Control | NA | 75.15 | 65.4 | 7.54E+06 | 18077 | 0.0000 |
| 1 | 100.0% | 0.027 | 39.75 | 67.3 | 3.97E+06 | 8031 | 0.0270 |
| 2 | 100.0% | 0.067 | 7.63 | 74.0 | 7.63E+05 | 991 | 0.0670 |
| 3 | 10.0% | 0.072 | 99.94 | 65.5 | 1.01E+07 | 32592 | 0.0072 |
| 4 | 10.0% | 0.101 | 88.93 | 66.2 | 5.17E+06 | 32643 | 0.0101 |
| 5 | 20.0% | 0.052 | 85.87 | 66.6 | 8.56E+06 | 22513 | 0.0104 |
| 6 | 20.0% | 0.079 | 51.56 | 68.4 | 5.17E+06 | 11874 | 0.0158 |
| 7 | 20.0% | 0.126 | 24.50 | 71.9 | 2.46E+06 | 4290 | 0.0252 |
| 11 | 20.0% | 0.129 | 0.12 | 82.8 | 1.01E+05 | 113 | 0.0258 |

TABLE 16

Four-week Cores

| Section | Material | Rate, g/yd$^2$ | G*, kPa | Phase Angle, ° | Complex Visc, mPaS | Abs Viscosity, PaS | Corr Rate |
|---|---|---|---|---|---|---|---|
| CN 1st | N. Control | NA | 125.50 | 63.6 | 1.28E+07 | 100442 | 0.0000 |
| CN 2nd | N. Control | NA | 75.15 | 65.4 | 7.54E+06 | 18077 | 0.0000 |
| 1 | 100.0% | 0.027 | 64.32 | 66.6 | 6.43E+06 | 21279 | 0.0270 |
| 2 | 100.0% | 0.067 | 11.65 | 72.6 | 1.16E+06 | 2010 | 0.0670 |
| 3 | 10.0% | 0.072 | 97.70 | 65.6 | 9.87E+06 | 32650 | 0.0072 |
| 4 | 10.0% | 0.101 | 91.07 | 66.4 | 9.18E+06 | 22992 | 0.0101 |
| 5 | 20.0% | 0.052 | 95.15 | 66.0 | 9.50E+06 | 22845 | 0.0104 |
| 6 | 20.0% | 0.079 | 66.94 | 67.6 | 6.72E+06 | 15622 | 0.0158 |
| 7 | 20.0% | 0.126 | 31.12 | 71.6 | 3.12E+06 | 2624 | 0.0252 |
| 11 | 20.0% | 0.129 | 1.01 | 83.1 | 1.01E+05 | 231 | 0.0258 |
| CS 1st | S. Control | NA | 72.75 | 67.3 | 7.28E+06 | 17776 | 0.0000 |
| CS 2nd | S. Control | NA | 84.42 | 65.5 | 8.57E+06 | 27033 | 0.0000 |

TABLE 17

Twenty-week Cores

| Section | Material | Rate, g/yd$^2$ | G*, kPa | Phase Angle, ° | Complex Visc, mPaS | Abs Viscosity, PaS | Corr Rate |
|---|---|---|---|---|---|---|---|
| CN 1st | N. Control | NA | 125.50 | 63.6 | 1.28E+07 | 100442 | 0.0000 |
| CN 2nd | N. Control | NA | 75.15 | 65.4 | 7.54E+06 | 18077 | 0.0000 |
| 1 | 100.0% | 0.027 | 89.50 | 62.7 | 8.99E+06 | 28353 | 0.0270 |
| 2 | 100.0% | 0.067 | 30.17 | 64.9 | 3.02E+06 | 2683 | 0.0670 |
| 3 | 10.0% | 0.072 | 143.92 | 62.5 | 1.44E+07 | 66367 | 0.0072 |
| 4 | 10.0% | 0.101 | 187.77 | 63.3 | 1.90E+07 | 45017 | 0.0101 |
| 5 | 20.0% | 0.052 | 113.50 | 63.1 | 1.14E+07 | not enough binder | 0.0104 |
| 6 | 20.0% | 0.079 | 117.50 | 63.2 | 1.17E+07 | 28781 | 0.0158 |
| 7 | 20.0% | 0.126 | 60.30 | 66.6 | 6.03E+06 | 10544 | 0.0252 |
| 11 | 20.0% | 0.129 | 5.92 | 73.5 | 5.92E+05 | 766 | 0.0258 |
| CS 1st | S. Control | NA | 72.75 | 67.3 | 7.28E+06 | 17776 | 0.0000 |
| CS 2nd | S. Control | NA | 84.42 | 65.5 | 8.57E+06 | 27033 | 0.0000 |

TABLE 18

Dynamic Friction Tester (DFT) (Average of six runs at two locations per section)

| Section | Time (hrs) | μ (@60 kph) | μ (@40 kph) | μ (@20 kph) |
|---|---|---|---|---|
| 1 | 0 | 0.52 | 0.49 | 0.48 |
|   | 24 | 0.34 | 0.33 | 0.34 |
|   | 96 | 0.37 | 0.35 | 0.35 |
| 2 | 0 | 0.52 | 0.49 | 0.49 |
|   | 24 | 0.38 | 0.37 | 0.38 |
|   | 96 | 0.4 | 0.38 | 0.38 |
| 3 | 0 | 0.55 | 0.51 | 0.5 |
|   | 24 | 0.46 | 0.45 | 0.45 |
|   | 96 | 0.47 | 0.45 | 0.44 |
| 4 | 0 | 0.55 | 0.55 | 0.55 |
|   | 24 | 0.47 | 0.46 | 0.47 |
|   | 96 | 0.46 | 0.45 | 0.44 |
| 5 | 0 | 0.56 | 0.55 | 0.56 |
|   | 24 | 0.44 | 0.44 | 0.44 |
|   | 96 | 0.47 | 0.45 | 0.44 |
| 6 | 0 | 0.55 | 0.55 | 0.55 |
|   | 24 | 0.47 | 0.46 | 0.47 |
|   | 96 | 0.46 | 0.45 | 0.45 |
| 7 | 0 | 0.58 | 0.57 | 0.57 |
|   | 24 | 0.46 | 0.46 | 0.46 |
|   | 96 | 0.46 | 0.44 | 0.44 |

TABLE 19

Dynamic Friction Tester (DFT) (% Difference from Time-0)

| Section | Time (hrs) | μ (@60 kph) | μ (@40 kph) | μ (@20 kph) |
|---|---|---|---|---|
| 1 | 0 | NA | NA | NA |
|   | 24 | −35% | −32% | −29% |
|   | 96 | −29% | −29% | −28% |
| 2 | 0 |  |  |  |
|   | 24 | −26% | −24% | −22% |
|   | 96 | −24% | −22% | −22% |
| 3 | 0 |  |  |  |
|   | 24 | −17% | −12% | −9% |
|   | 96 | −15% | −12% | −12% |
| 4 | 0 |  |  |  |
|   | 24 | −16% | −16% | −15% |
|   | 96 | −16% | −18% | −20% |
| 5 | 0 |  |  |  |
|   | 24 | −22% | −21% | −21% |
|   | 96 | −17% | −18% | −21% |
| 6 | 0 |  |  |  |
|   | 24 | −15% | −16% | −14% |
|   | 96 | −17% | −18% | −18% |
| 7 | 0 |  |  |  |
|   | 24 | −20% | −20% | −19% |
|   | 96 | −21% | −22% | −22% |

What is claimed is:

1. An asphalt binder additive composition selected from the group consisting of
   Emulsion D: 9.9% linseed oil, 0.1% salicylic acid, 89% water, and 1% polysorbate 20,
   Emulsion E: 19.8% linseed oil, 0.2% salicylic acid, 79% water, and 1% polysorbate 20, and
   Emulsion F: 19.8% linseed oil, 0.2% salicylic acid, 79.5% water, and 0.5% polysorbate 20.

2. The composition of claim 1 wherein the asphalt binder additive composition is Emulsion D: 9.9% linseed oil, 0.1% salicylic acid, 89% water, and 1% polysorbate 20.

3. The composition of claim 1 wherein the asphalt binder additive composition is Emulsion E: 19.8% linseed oil, 0.2% salicylic acid, 79% water, and 1% polysorbate 20.

4. The composition of claim 1 wherein the asphalt binder additive composition is Emulsion F: 19.8% linseed oil, 0.2% salicylic acid, 79.5% water, and 0.5% polysorbate 20.

5. A method for preserving an asphalt surface comprising the step of applying a layer of a composition of claim 1 to the surface.

\* \* \* \* \*